United States Patent
Farley et al.

(10) Patent No.: US 12,544,265 B2
(45) Date of Patent: Feb. 10, 2026

(54) OPTICAL FIBER CONNECTOR AND ADAPTER

(71) Applicant: Alcon Inc., Fribourg (CH)

(72) Inventors: Mark Harrison Farley, Laguna Hills, CA (US); Chenguang Diao, Irvine, CA (US); Mark Alan Hopkins, Mission Viejo, CA (US); Alireza Mirsepassi, Irvine, CA (US); Timothy C. Ryan, Laguna Hills, CA (US); Ronald T. Smith, Irvine, CA (US); Dennis Martin Terenzio, Boise, ID (US)

(73) Assignee: Alcon Inc., Fribourg (CH)

( * ) Notice: Subject to any disclaimer, the term of this patent is extended or adjusted under 35 U.S.C. 154(b) by 532 days.

(21) Appl. No.: 18/062,663

(22) Filed: Dec. 7, 2022

(65) Prior Publication Data

US 2023/0181367 A1    Jun. 15, 2023

Related U.S. Application Data

(60) Provisional application No. 63/265,159, filed on Dec. 9, 2021.

(51) Int. Cl.
*A61F 9/008* (2006.01)
*A61B 18/00* (2006.01)
*A61B 18/22* (2006.01)

(52) U.S. Cl.
CPC .......... *A61F 9/00823* (2013.01); *A61B 18/22* (2013.01); *A61B 2018/00589* (2013.01); *A61B 2018/2211* (2013.01)

(58) Field of Classification Search
None
See application file for complete search history.

(56) References Cited

U.S. PATENT DOCUMENTS

| 4,406,515 A | 9/1983 | Roberts |
| 5,074,637 A | 12/1991 | Rink |

(Continued)

FOREIGN PATENT DOCUMENTS

| JP | H07336306 A | 12/1995 |
| JP | 2019514054 A | 5/2019 |

(Continued)

OTHER PUBLICATIONS

Amphenol, "Connectors Fiber Optic Catalog" © 2002 Amphenol, dated Jul. 2002; (accessed from a href="https://www.mouser.com/datasheet/2/18/Amphenol_02192019_906-101-3003-1535129.pdf" target="_blank"https://www.mouser.com/datasheet/2/18/Amphenol_02192019_906-101-3003-1535129.pdf/a on Mar. 2, 2023).

(Continued)

*Primary Examiner* — Michael T. Holtzclaw
(74) *Attorney, Agent, or Firm* — Patterson + Sheridan, LLP

(57) ABSTRACT

Certain embodiments disclosed herein provide systems and devices for coupling optical fibers with laser surgical systems. In particular, certain aspects provide a push-pull connector and adapter for releasably coupling an optical fiber with a port of a laser surgical system. The connector and adapter facilitate mechanical lateral and rotational guidance of the optical fiber during insertion into the port to ensure proper alignment (e.g., clocking) of the optical fiber's cores with a laser beam pattern propagated by the laser surgical system. Accordingly, the connector and adaptor enable improved coupling efficiency between the laser beam pattern and one or more cores of the optical fiber, and therefore improved power uniformity between multiple laser beams transmitted through the cores.

15 Claims, 18 Drawing Sheets

(56) References Cited

U.S. PATENT DOCUMENTS

| | | | |
|---|---|---|---|
| 5,076,656 A | 12/1991 | Briggs et al. | |
| 5,373,574 A | 12/1994 | Marazzi et al. | |
| 5,436,994 A | 7/1995 | Ott et al. | |
| 5,852,694 A | 12/1998 | Kimura et al. | |
| 5,963,692 A | 10/1999 | Marazzi et al. | |
| 6,065,882 A | 5/2000 | Roller et al. | |
| 6,626,582 B2 | 9/2003 | Farrar et al. | |
| 7,347,630 B1 | 3/2008 | Jeon et al. | |
| 8,075,200 B2 | 12/2011 | Uboldi | |
| 8,087,833 B2 | 1/2012 | Fantini et al. | |
| 8,561,280 B2 | 10/2013 | Diao et al. | |
| 9,213,147 B2 | 12/2015 | Mitchell et al. | |
| 10,245,181 B2 | 4/2019 | Diao | |
| 11,009,667 B2 | 5/2021 | Isenhour et al. | |
| 11,109,938 B2 | 9/2021 | Horn et al. | |
| 11,160,686 B2 | 11/2021 | Cook et al. | |
| 2009/0052844 A1 | 2/2009 | Van Der Steen | |
| 2010/0034502 A1* | 2/2010 | Lu | G02B 6/3894 385/139 |
| 2013/0150839 A1 | 6/2013 | Smith | |
| 2017/0139158 A1* | 5/2017 | Coenegracht | G02B 6/3825 |
| 2018/0143384 A1* | 5/2018 | Tong | G02B 6/3874 |
| 2018/0243136 A1 | 8/2018 | Diao | |
| 2018/0243137 A1 | 8/2018 | Diao | |

FOREIGN PATENT DOCUMENTS

| | | |
|---|---|---|
| WO | 9705512 A1 | 2/1997 |
| WO | 0003281 A1 | 1/2000 |
| WO | 2017173419 A1 | 10/2017 |
| WO | 2018144128 A2 | 8/2018 |

OTHER PUBLICATIONS

Corning "SC, FC, and ST Compatible Heat-Cure Connectors and SC and FC Angled Heat-Cure Connectors with Preradiused Ceramic Ferrules", Standard Recommended Procedure 006-355; Issue 8, Feb. 2016 (accessed from a href="https://www.corning.com/catalog/coc/documents/standard-recommended-procedures/006-355.pdf"target="_blank"https://www.corning.com/catalog/coc/documents/standard-recommended-procedures/006-355.pdf/a on Mar. 2, 2022).

* cited by examiner

OPTICAL FIBER CONNECTOR AND ADAPTER

BACKGROUND

In a wide variety of medical procedures, laser light (e.g., laser treatment beam ("treatment beam"), laser aiming beam ("aiming beam"), etc.) is used to assist in surgery and/or treat patient anatomy. For example, in laser photocoagulation, a laser probe propagates a laser treatment beam to cauterize blood vessels at a burn spot across the retina. A laser treatment beam is typically transmitted from a surgical laser system through an optical fiber that proximally terminates in a port connector, which connects to the surgical laser system, and distally terminates in the laser probe, which is manipulated by a surgeon. Note that, herein, a distal end of a component refers to the end that is closer to a patient's body while the proximal end of the component refers to the end that is facing away from the patient's body or is in proximity to, for example, the surgical laser system.

In addition to cauterizing blood vessels at the burn spot, the treatment beam may also damage some of the rods and cones that are present in the retina that provide vision, thereby, affecting eyesight. Since vision is most acute at the central macula of the retina, the surgeon arranges the laser probe to generate a burn spot in the peripheral areas of the retina. During the procedure, the surgeon drives the probe with a non-burning aiming beam to illuminate the retinal area that is to be photocoagulated. Due to the availability of low-power red laser diodes, the aiming beam is generally a low-power red laser light. Once the surgeon has positioned the laser probe so as to illuminate a desired retinal spot with the aiming beam, the surgeon activates the laser treatment beam through a foot pedal or other means to photocoagulate, for example, the illuminated area or an area encompassing the illuminated area, using the laser treatment beam. Having burned a retinal spot, the surgeon repositions the probe to illuminate a new spot with the aiming light, activates the laser treatment beam to photocoagulate the new spot, repositions the probe, and so on until a desired number of burned laser spots are distributed across the retina.

Certain types of laser probes coagulate or burn multiple spots at a time, which may result in a faster and more efficient photocoagulation. For example, a surgical laser system that is coupled to one of such laser probes through an optical fiber may be configured to split a single laser beam into multiple laser beams that exhibit a multi-spot laser pattern. In such an example, the surgical laser system transmits the multiple laser beams onto a proximal interface plane of the optical cable, which may include an array of multiple optical fibers, or a multi-core fiber, that exhibit a corresponding fiber pattern. The multi-core optical fiber can have the additional capability to transmit an illumination beam encompassing and surrounding the fiber cores containing the laser beams, which provides a surgical visualization benefit.

When utilizing a multi-spot laser system with a multi-core optical fiber, it is imperative to have each spot of a transmitted multi-spot laser beam aligned with a core of the multi-core optical fiber on the proximal interface plane of the fiber. Even a slight misalignment between the laser spots and fiber cores may cause decreased coupling efficiency of the laser spots into the fiber cores, thus decreasing the power uniformity of the multiple laser beams transmitted through the multi-core fiber, and further increasing unwanted transmission thereof outside the fiber cores.

Therefore, there is a need for improved systems and methods for aligning multi-core fibers with multi-spot laser beam patterns that address the drawbacks described above.

SUMMARY

The present disclosure relates generally to surgical laser systems, and more specifically, to systems and devices for coupling and aligning optical fibers with surgical laser systems.

In certain embodiments, a system for coupling an optical fiber to a surgical laser system is provided. The system includes a port adapter configured to receive an optical fiber, the port adapter comprising: a substantially cylindrical barrel, comprising: a distal portion having a first inner diameter; a medial portion having a second inner diameter smaller than the first inner diameter; a tapered surface disposed between the distal portion and the medial portion, the tapered surface configured to provide axial guidance during insertion of the optical fiber into the port adapter; a clocking key disposed on an outer surface of the distal portion, the clocking key configured to facilitate quasi-helical guided rotation of the optical fiber during insertion into the port adaptor; and a tapered cam slot formed in the distal portion, the tapered cam slot formed on a circumferentially opposite side of the distal portion relative to the clocking key. A sleeve is disposed within the medial portion of the barrel, the sleeve configured to provide a friction- and wear-resistant inner surface of the medial portion for high precision, lateral optical alignment of the fiber cores to the laser beam within approximately less than 10 microns during insertion and removal of the optical fiber into/from the port adapter.

The following description and the related drawings set forth in detail certain illustrative features of one or more embodiments, including those described above.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

In the following description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described examples is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Note that, as described herein, a distal end, segment, or portion of a component refers to the end, segment, or portion that is closer to a patient's body during use thereof. On the other hand, a proximal end, segment, or portion of the component refers to the end, segment, or portion that is distanced further away from the patient's body is in proximity to, for example, a surgical laser system.

As used herein, the term "about" may refer to a +/−10% variation from the nominal value. It is to be understood that such a variation can be included in any value provided herein.

Certain embodiments disclosed herein provide systems and devices for coupling optical fibers with laser surgical systems. In particular, certain aspects provide a connector and an adapter for coupling an optical fiber with a port of a laser surgical system. The connector and adapter facilitate mechanical lateral and rotational guidance of the optical fiber during insertion into the port to ensure proper alignment (e.g., clocking) of the optical fiber's cores with a laser beam pattern propagated by the laser surgical system. The methods and systems described herein may be utilized in combination with any suitable laser surgical systems, such as those described below.

Example Surgical Laser System

Figure 1:
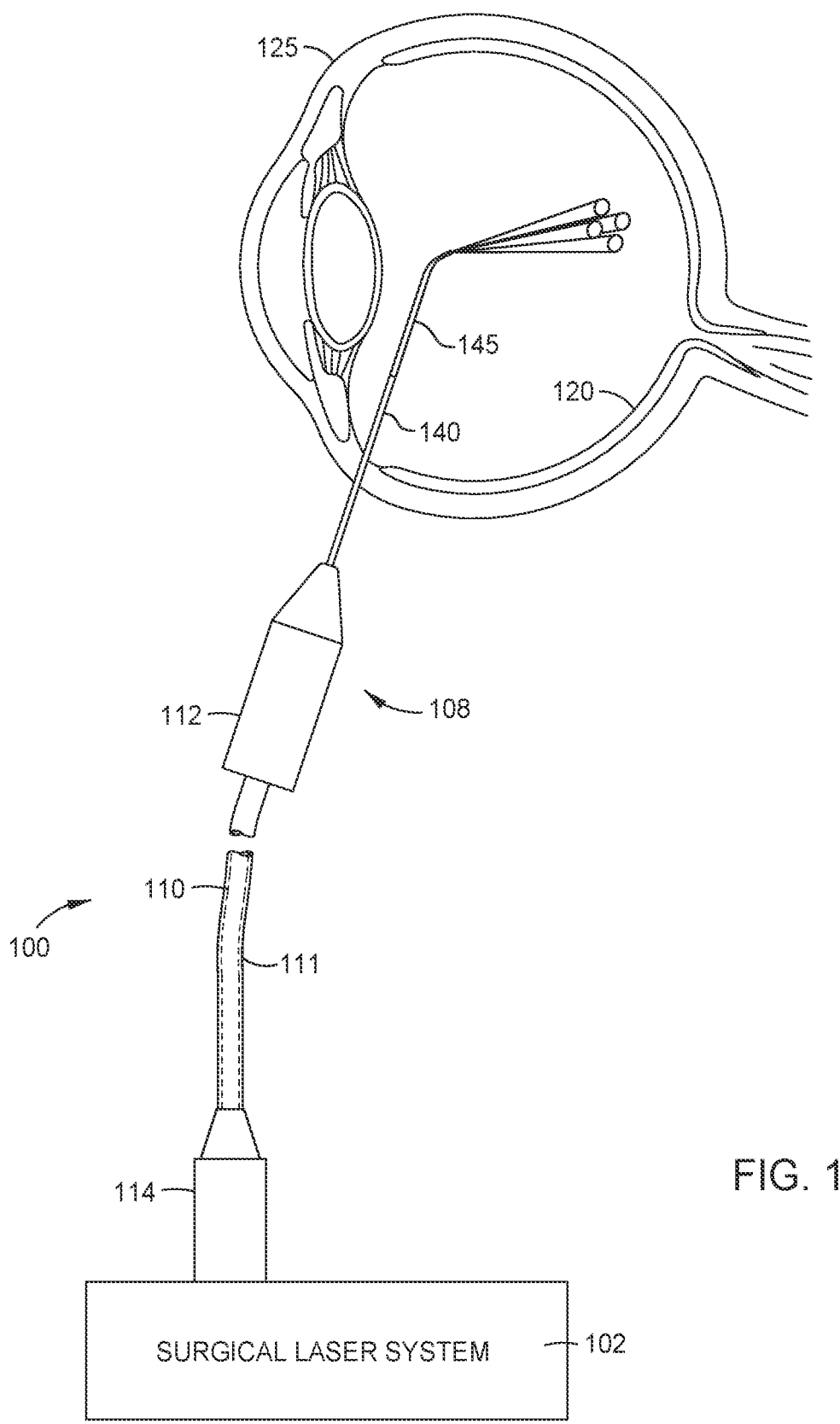
FIG. 1 illustrates a plan view of an example system for generating laser beams for delivery to a surgical target, in accordance with certain embodiments of the present disclosure.

FIG. 1 illustrates an example system 100 for performing a laser-assisted ophthalmic procedure. System 100 includes a surgical laser system 102 having one or more laser sources for generating laser beams. For example, a first laser source within surgical laser system 102 may generate a treatment beam with a first wavelength (e.g., ~532 nanometers (nm)) while a second laser source may generate an aiming beam with a second wavelength (e.g., ~635 nm). A user, such as a surgeon, may first trigger the surgical laser system 102 (e.g., via a foot switch, voice commands, etc.) to emit the aiming beam onto a desired retinal spot. Once the surgeon has positioned the laser probe so as to illuminate the desired retinal spot with the aiming beam, the surgeon activates the treatment beam, such as through a foot pedal or other means, to treat patient anatomy (e.g., photocoagulate the desired retinal spot using the treatment beam).

In certain embodiments, surgical laser system 102 is integrated with one or more additional devices and/or systems. For example, in certain embodiments, surgical laser system 102 may be integrated in a surgical console, such as a surgical console for performing ophthalmic surgical procedures, including vitreoretinal procedures, cataract surgeries, corneal transplants, glaucoma surgeries, LASIK (laser-assisted in situ keratomileusis) surgeries, refractive lens exchanges, trabeculectomies, keratotomy procedures, and/or keratoplasty surgeries, etc. Consoles that are capable of performing two or more of these procedures are also within the scope of this disclosure. An example of a console configured for performing vitreoretinal procedures is the Constellation® System available from Alcon Laboratories, Inc., Fort Worth, Texas. An example of a console configured for performing cataract surgeries is the Centurion® System available from Alcon Laboratories, Inc., Fort Worth, Texas.

As shown, system 100 further includes a connector 114 that couples to a port adapter of an optical port (shown in FIG. 2) of surgical laser system 102. FIG. 1 also shows an optical fiber 110 inside an optical fiber cable 111, the optical fiber 110 having a distal end that couples to and extends through a probe 108 and a proximal end that couples to and extends through connector 114. In some cases, as further described herein, the optical fiber 110 may include more than one fiber. In the example of FIG. 1, connector 114 includes a ferrule (shown in FIG. 2) with an opening in which the proximal end of optical fiber 110 is inserted. The proximal end of optical fiber 110 includes an interface plane (also referred to as a proximal entrance plane) upon which laser beams from surgical laser system 102 may be focused when the ferrule is inserted into the optical port of surgical laser system 102. The interface plane of optical fiber 110 comprises the exposed proximal ends of the one or more cores where laser beams may be directed to. In the example of FIG. 1, optical fiber 110 is a multi-core optical fiber (MCF) with four cores. As such, the interface plane of the proximal end of optical fiber 110 comprises the proximal ends of the four cores upon which laser beams may be focused.

Surgical laser system 102 may be configured to split a single laser beam that is generated by a laser source into multiple laser beams that exhibit a laser spot pattern. For example, surgical laser system 102 may split an aiming beam into four aiming beams and then deliver the four aiming beams to the interface plane of optical fiber 110 through the opening of the ferrule within connector 114. Surgical laser system 102 may further be configured to split the treatment beam into four treatment beams and deliver the four treatment beams to the interface plane of optical fiber 110 through the opening of the ferrule. In such an example, each of the cores of optical fiber 110 would then be transmitting a multi-wavelength or combined beam, which may refer to a treatment beam combined with an aiming beam. Though certain aspects are described with respect to the cores of the optical fiber transmitting a combined beam, it should be noted that the cores of optical fiber 110 can also individually transmit either the treatment beam or the aiming beam, depending on which beam(s) are activated and incident on the optical fiber 110.

In some examples, surgical laser system 102 may also propagate an illumination beam into an interface plane of, for example, optical fiber 110 (which may also include a proximal end of a cladding that holds the cores within optical fiber 110) in order to illuminate the inside of the eye, especially areas of the retina 120 that are to be photocoagulated. In certain aspects, an illumination beam may be generated by a white light-emitting diode (LED).

Optical fiber 110 delivers the combined beams to probe 108, which propagates a multi-spot pattern (e.g., four spots) of combined beams to the retina 120 of a patient's eye 125. Probe 108 includes a probe body 112 and a probe tip 140 that house and protect the distal end of optical fiber 110. A distal end portion 145 of the probe tip 140 may also contain a lens that focuses the combined beams on the retina 120.

Figure 2:
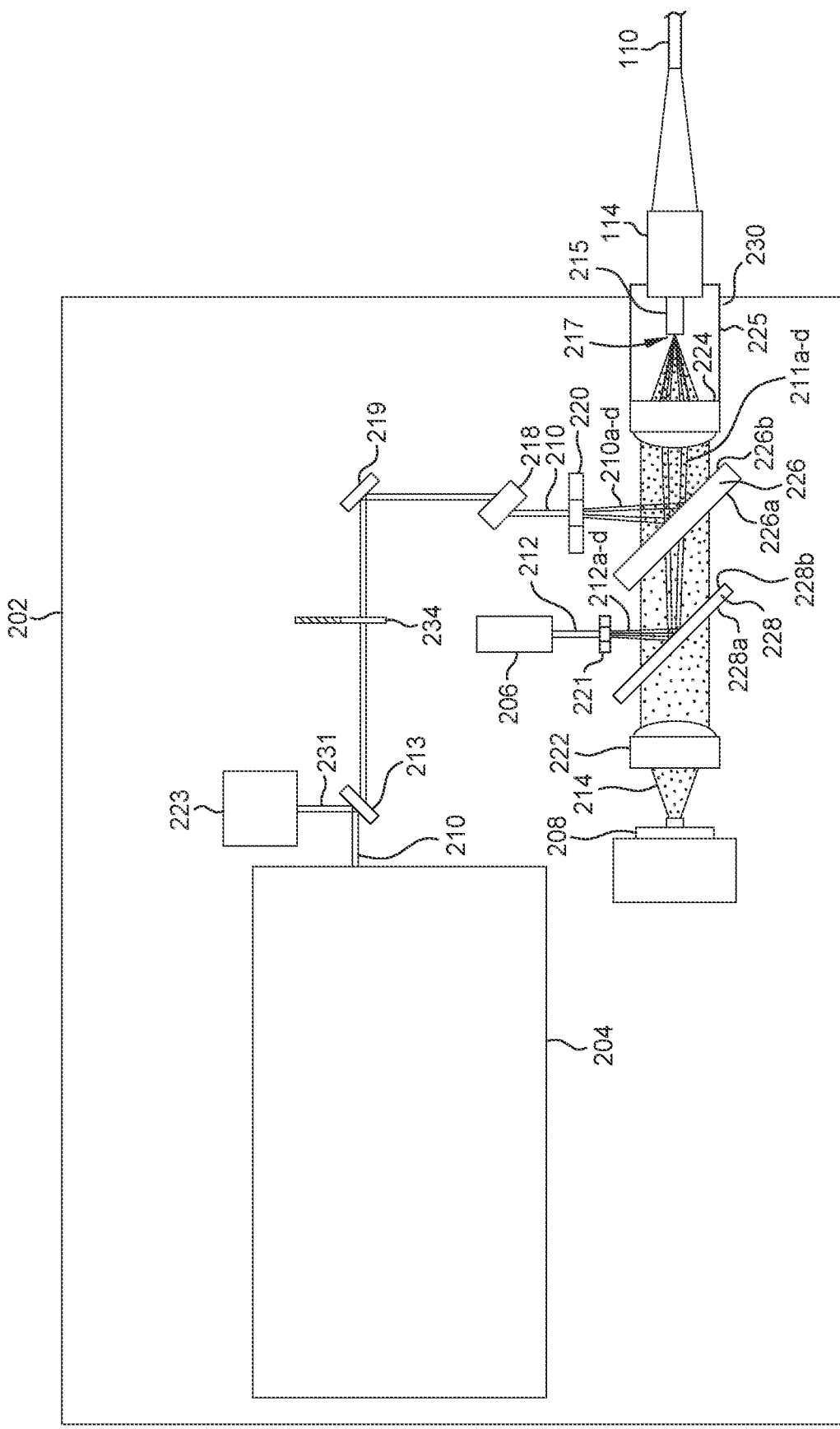
FIG. 2 illustrates a schematic plan view of an example surgical laser system, and the components therein, in accordance with certain embodiments of the present disclosure.

FIG. 2 illustrates an example surgical laser system 202, and the components therein, that may be implemented according to embodiments described herein. Surgical laser system 202 comprises a laser source 204, which propagates a treatment beam 210, laser source 206, which propagates an aiming beam 212, and a light source 208, which propagates an illumination beam 214. Surgical laser system 202 further includes a plurality of lenses, diffractive elements, beam splitters, and other optical relay devices for polarizing, isolating, collimating, selecting, dividing, combining, relaying, and condensing the laser and illumination beams between their respective sources and desired ports, which may together be referred to as an "optical relay system."

At the outset of the surgery, a surgeon may activate light source 208 in order to illuminate the inside of the eye's globe and make it easier to view the retina. As shown, once emitted by light source 208, illumination beam 214 (stippled segment) is received by collimating lens 222, which is configured to produce a beam with parallel rays of light. In certain embodiments, collimating lens 222 may be a multi-element achromat comprising two singlet lenses and one doublet lens. Therefore, as shown, illumination beam 214 emerges with parallel rays of light from the other side of collimating lens 222 and passes through beam splitters 228 and 226 (which may also be referred to as dichroic mirrors), respectively, to reach a condensing lens 224. In certain embodiments, condensing lens 224 may be a multi-element achromat comprising two singlet lenses and one doublet lens. In such embodiments, condensing lens 224 has the same design as collimating lens 222, except that the assembly is reversed (e.g., rotated by 180 degrees), thereby creating a one-to-one magnification imaging system. Each of beam splitters 228 and 226 may have different coatings on their two sides, 228a and 228b, and 226a and 226b, respectively. For example, sides 228a and 226a are coated such that they allow light propagated thereon to pass through beam splitters 228 and 226. As such, illumination beam 214, which is propagated onto sides 228a and 226a passes beam splitters 228 and 226. On the other hand, sides 228b and 226b are coated to reflect light or laser beams such as aiming beam 212 and treatment beam 210, respectively, as further described below.

Condensing lens 224 then converges illumination beam 214 into an interface plane of a proximal end of an optical fiber, such as optical fiber 110, which is coupled to port adapter 225 at optical port 230 of surgical laser system 202 via connector 114. Port adapter 225 is disposed adjacent to condensing lens 224 and is configured to mate with connector 114 at optical port 230 for coupling of optical fiber 110 to surgical laser system 202. As described in relation to FIG. 1, optical fiber 110 may have four cores embedded within a larger-diameter cladding. As such, condensing lens 224 focuses illumination beam 214 into an interface plane of optical fiber 110 such that illumination beam 214 is propagated, along an entire length of the cladding and within each of the four cores of optical fiber 110, to the distal end of a surgical probe (e.g., probe 108 of FIG. 1) that is coupled to optical fiber 110. As described above, the interface plane of optical fiber 110 comprises the proximal ends of the four cores and cladding thereof that are exposed through opening 217 of port adapter 225, respectively, via ferrule 215.

Once the surgeon is able to view inside the eye's globe, the surgeon may project from the distal end of the probe one or more desired aiming beam spots onto the retina. More specifically, after activation by the surgeon, laser source 206 emits aiming beam 212 (e.g., a red laser beam) onto diffraction optical element (DOE) 221. A diffraction segment may also be referred to as a "segment" herein. In the example of FIG. 2, DOE 221 is positioned such that aiming beam 212 is aligned with the middle segment of DOE 221, which diffracts aiming beam 212 into aiming beams 212a-d (e.g., four aiming beams). However, a surgeon may change the position of DOE 221 in order to select a different number of beams (e.g., 2 or 1). For example, using voice command or some other feature of surgical laser system 202, a surgeon may position DOE 221 to align aiming beam 212 with a different segment of DOE 221, which may diffract aiming beam 212 into two or one or other numbers of beams.

Once diffracted, the resulting aiming beams are reflected by beam splitter 228 through beam splitter 226 and onto condensing lens 224. In examples where aiming beams 212a-d are red aiming beams, beam splitter 228 may be a red dichroic optical element, and aiming beams 212a-d may reflect off of a narrowband red spectral notch in beam splitter 228. Condensing lens 224 then focuses the four aiming beams onto the interface plane of a proximal end of optical fiber 110 such that each of the aiming beams is propagated, along an entire length of a corresponding core of optical fiber 110, to the distal end of a surgical probe (e.g., probe 108 of FIG. 1). Each of the four aiming beams focuses with high coupling efficiency into the corresponding core within the 4-core MCF, and propagated down the length of the core to the distal end of the MCF. This allows the surgeon to project from the distal end of the probe four desired aiming beam spots onto the retina.

As described above, once the surgeon has positioned and activated the laser probe so as to project aiming beam spots onto the retina, the surgeon activates laser source 204, such as through a foot pedal or other means, to treat patient anatomy (e.g., photocoagulate the desired retinal spot using the treatment beam). When activated, laser source 204 emits treatment beam 210, e.g., a green laser beam, as shown in FIG. 2. The treatment beam 210 reaches beam splitter 213, which is configured to allow a substantial portion of treatment beam 210 to pass through, while reflecting a trivial portion 231 onto sensor 223. Sensor 223 is a light sensor configured to detect whether laser source 204 is active or not and to monitor the treatment beam power. After passing through beam splitter 213 and provided that the shutter 234 is in an open position to permit the treatment beam 210, treatment beam 210 is received at fixed fold mirror 219, which is configured to reflect treatment beam 210 onto beam splitter 218.

In certain embodiments, the surgical laser system may also include a shutter 234 arranged between the laser source 204 and the fixed fold mirror 219. The shutter 234, may be configured to alternatively block or permit the treatment laser beam 210 from reaching the fixed fold mirror 219. A surgeon or surgical staff member can control the shutter 234 (e.g., via a foot switch, voice commands, etc.) to emit the laser aiming beam and fire the treatment laser beam (i.e., open the shutter 234) to treat patient anatomy (e.g., photo-coagulation). In each case, the beam splitter 218 may direct the laser beams towards optical port 230.

As shown, the treatment beam 210 passes through beam splitter 218 before reaching DOE 220. DOE 220, similar to DOE 221, then diffracts treatment beam 210 into treatment beams 210a-210d (e.g., four treatment beams). However, a surgeon may change the position of DOE 220 in order to select a different number of beams (e.g., 2 or 1). For example, using voice command or some other feature of surgical laser system 202, a surgeon may position DOE 220 to align treatment beam 210 with a different segment of DOE 220, which may diffract treatment beam 210 into two or one or other numbers of beams. Treatment beams 210a-210d are then received at beam splitter 226, which reflects treatment beams 210a-210d onto condensing lens 224. In examples where treatment beams 210a-d are green treatment beams, beam splitter 226 may be a green dichroic optical element, and treatment beams 210a-d may reflect off of a narrowband green spectral notch in beam splitter 226. Treatment beams 210a-d are reflected by beam splitter 226 at an angle with respect to beam splitter 226 that is equal to the angle with which aiming beams 212a-d are passed through beam splitter 226. Therefore, when laser source 204 is active, transmitted treatment beams 210a-d and aiming beams 212a-d are combined (for example, such that they overlay each other) creating combined beams 211a-d), before reaching condensing lens 224.

Condensing lens 224 focuses combined beams 211a-211d onto an interface plane of the proximal end of optical fiber 110 such that each of the combined beams 211a-211d is propagated, along an entire length of a corresponding core of optical fiber 110, to the distal end of a surgical probe (e.g., probe 108 of FIG. 1). More specifically, in the example of FIG. 2, optical fiber 110 is an MCF with four cores, such as cores A, B, C, and D. In such an example, condensing lens 224 focuses combined beams 211a-211d onto an interface plane of a proximal end of optical fiber 110 such that, for example, combined beam 211a is propagated onto core A, combined beam 211b is propagated onto core B, combined beam 211c is propagated onto core C, and combined beam 211d is propagated onto core D. Additionally, the illumination beam 214 is propagated through all of the MCF fiber cores and through the cladding surrounding the cores.

Example Optical Fiber Connector and Adapters

Aspects of the present disclosure provide systems and devices for coupling optical fibers with laser surgical systems. In particular, certain aspects provide a connector and an adapter for coupling an optical fiber with an optical port of a laser surgical system. The connector and adapter facilitate efficient lateral and rotational alignment of the optical fiber with the laser surgical system in all six degrees of freedom to enable precise clocking of one or more cores of the optical fiber with a laser beam pattern of the laser surgical system. Accordingly, the connector and adaptor enable improved coupling efficiency between the laser beam pattern and one or more cores of the optical fiber, and therefore improved power uniformity between multiple laser beams transmitted through the cores. The systems and devices described herein may be utilized in combination with any suitable laser surgical systems, such as those described with reference to FIGS. 1-2.

Generally, embodiments of the present disclosure provide several advantages over conventional optical fiber connectors and adapters. For example, certain embodiments described herein provide efficient and ergonomic push-to-connect, pull-to-connect mating of optical fibers with, for example, laser surgical systems utilizing progressive (e.g., sequential coarse and fine), mechanically guided positioning and rotation during connection. Further, certain embodiments described herein provide visual and/or tactile confirmation during connection/disconnection and clocking angle alignment (e.g., zero clocking angle) of an optical fiber with a laser surgical system for a user, in addition to integrated probe-captured connection-state detection and/or RFID-based connection-state detection. Certain embodiments described herein further provide lateral and axial mechanical isolation of an optical fiber from a fiber cable and/or connector, via utilization of a spring-loaded system, to facilitate easier clocking of the optical fiber with a laser surgical system. Still further, certain embodiments described herein provide connectors and/or adapters formed of materials facilitating long service-free life (e.g., 5,000+ repeated fiber mate/demate connections) at a low cost suitable for single-use sterilized medical devices.

Figure 3A:
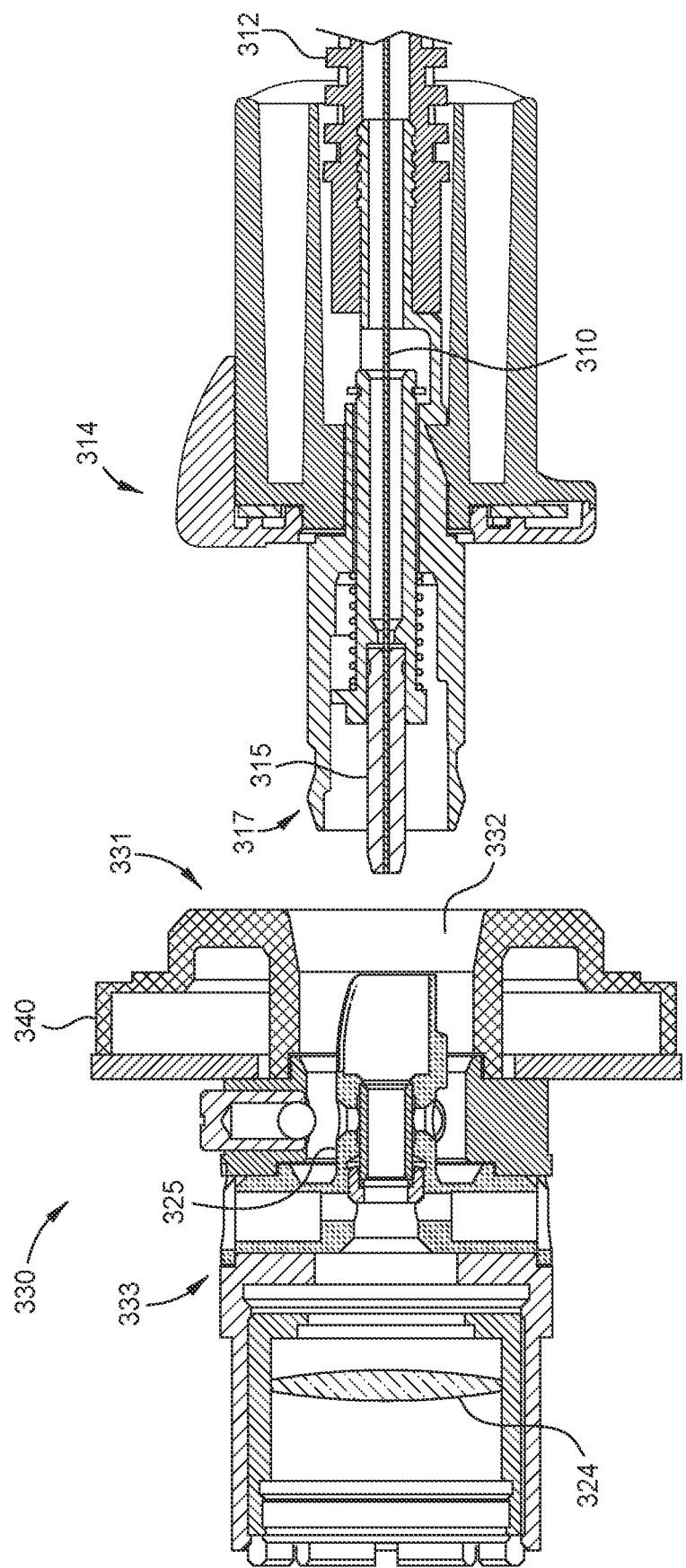
FIGS. 3A-3B illustrate cross-sectional side views of an example optical port of a surgical laser system, including an example port adapter, and an example optical fiber connector in an unmated state and a mated state, respectively, in accordance with certain embodiments of the present disclosure.
Figure 3B:
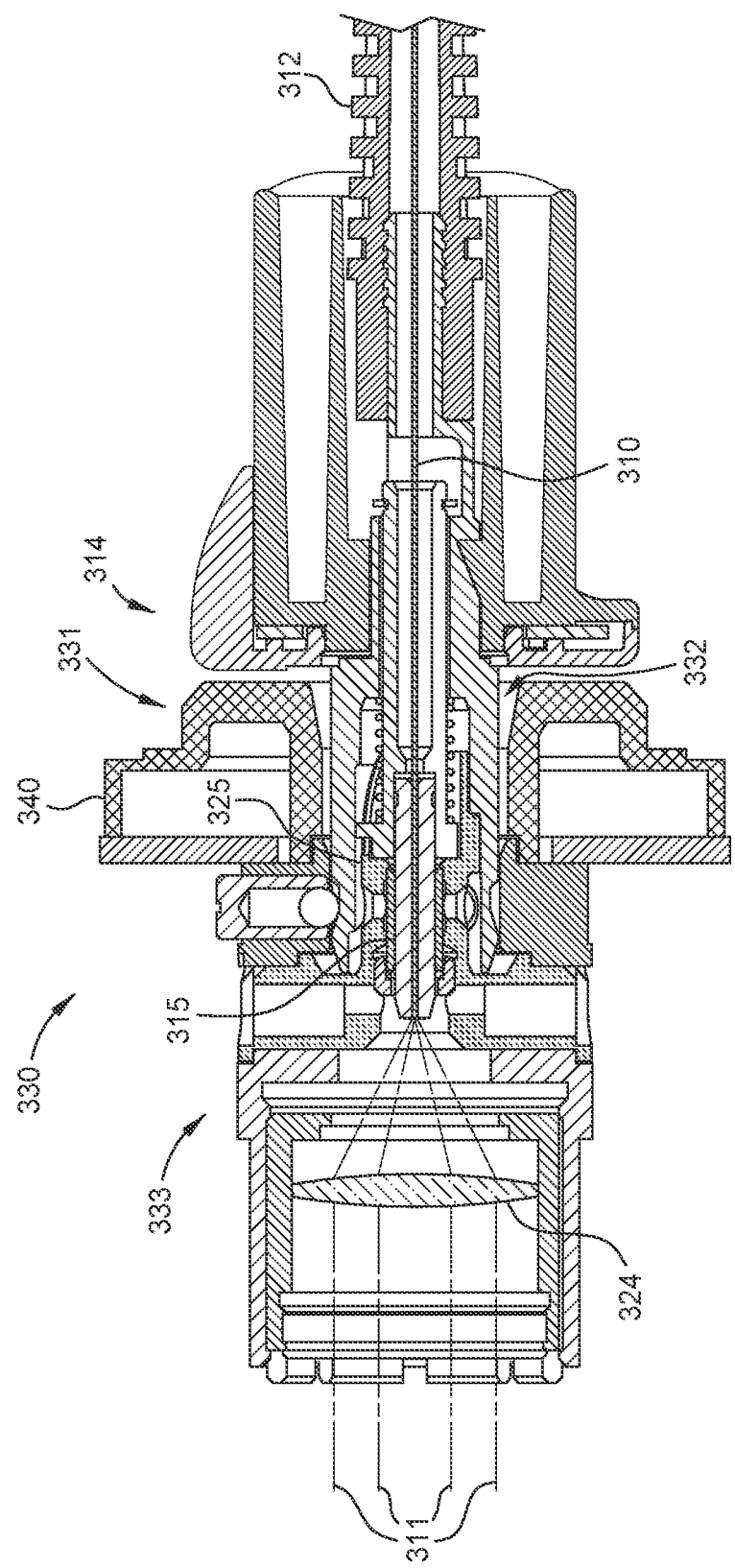

FIGS. 3A-3B illustrate cross-sectional side views of an example optical port 330 of a surgical laser system, including an example port adapter 325, and an example optical fiber connector 314 in an unmated state and a mated state, respectively, in accordance with certain embodiments of the present disclosure. The examples in FIGS. 3A-3B may be described as "user-assisted" examples, as some degree of rotational alignment (i.e., clocking) of optical fiber connector 314, and therefore, optical fiber 310 therein, is performed by the user when coupling optical fiber connector 314 to optical port 330.

As shown, optical port 330 includes port adapter 325, which is at least partially disposed through an opening 332 in a cover plate 340 at distal end 331 of optical port 330. In certain embodiments, cover plate 340 couples to an outer panel of a surgical laser system and/or surgical console for performing ophthalmic surgical procedures, such as a vitreoretinal surgical console or a phacoemulsification console. An opposing, proximal end 333 of optical port 330 is disposed adjacent to condensing lens 324, which is configured to focus illumination and/or treatments beams 311 onto optical fiber 310 disposed within optical fiber connector 314. Together, optical port 330 and condensing lens 324 may be referred to as a "chimney." Similar to optical fiber 110 described above, optical fiber 310 may be a single-core optical fiber (SCF) or a multi-core optical fiber (MCF).

Optical fiber connector 314 includes ferrule 315 at proximal end 317 thereof, through which a proximal end of optical fiber 310 is inserted. Ferrule 315 and optical fiber 310 are angularly aligned and angularly fixed within optical fiber connector 314. From ferrule 315, optical fiber 310 extends distally through optical fiber connector 314 and into cable 312, which may protect and couple optical fiber 310 with, for example, a surgical probe or tool.

As shown in FIG. 3B, when fully inserted into optical port 330, a proximal end of ferrule 315 is disposed within port adapter 325 such that condensing lens 324 may converge illumination, aiming, and/or treatment beams 311 into an interface plane of the proximal end of optical fiber 310. During insertion, port adapter 325 and optical fiber connector 314 mechanically guide the lateral position and rotational (e.g., clocking) orientation of optical fiber connector 314 and ferrule 315 with sequential dual-key, dual-slot coarse and fine alignment, such that each core of optical fiber 310 is precisely aligned with one or more illumination, aiming, and/or treatment beams 311. Thus, port adapter 325 and optical fiber connector 314 enable improved coupling efficiency between beams 311 and the cores of optical fiber 310, as well as improved power uniformity of beams 311 traveling through optical fiber 310.

Various individual views of optical port 330, including port adapter 325, and optical fiber connector 314, are shown in FIGS. 4A-6C, and therefore, optical port 330, port adapter 325, and optical fiber connector 314 are described in further detail with reference to FIGS. 4A-6C.

Figure 4A:
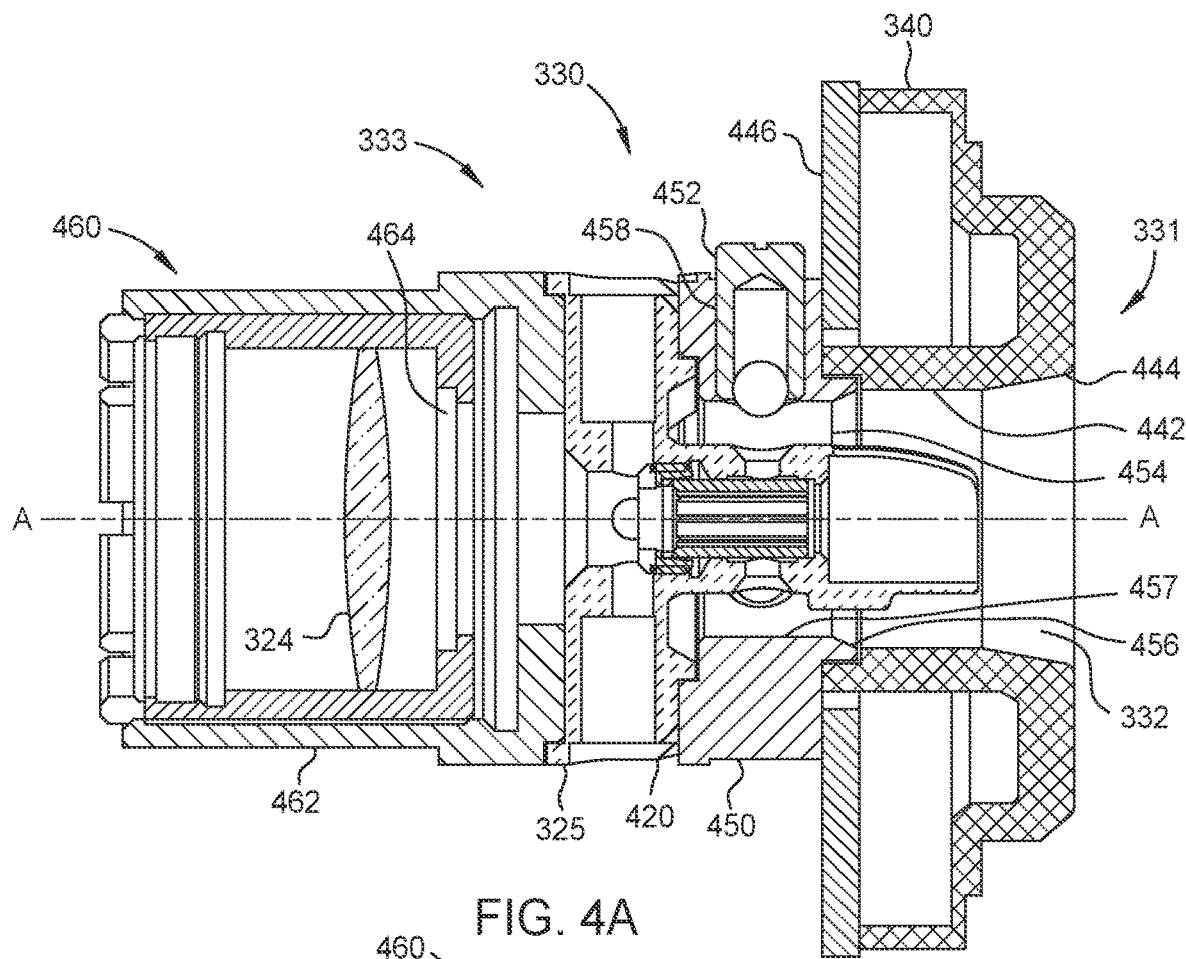
FIG. 4A illustrates a cross-sectional side view of the optical port of FIG. 3, including the port adapter, in accordance with certain embodiments of the present disclosure.
Figure 4B:
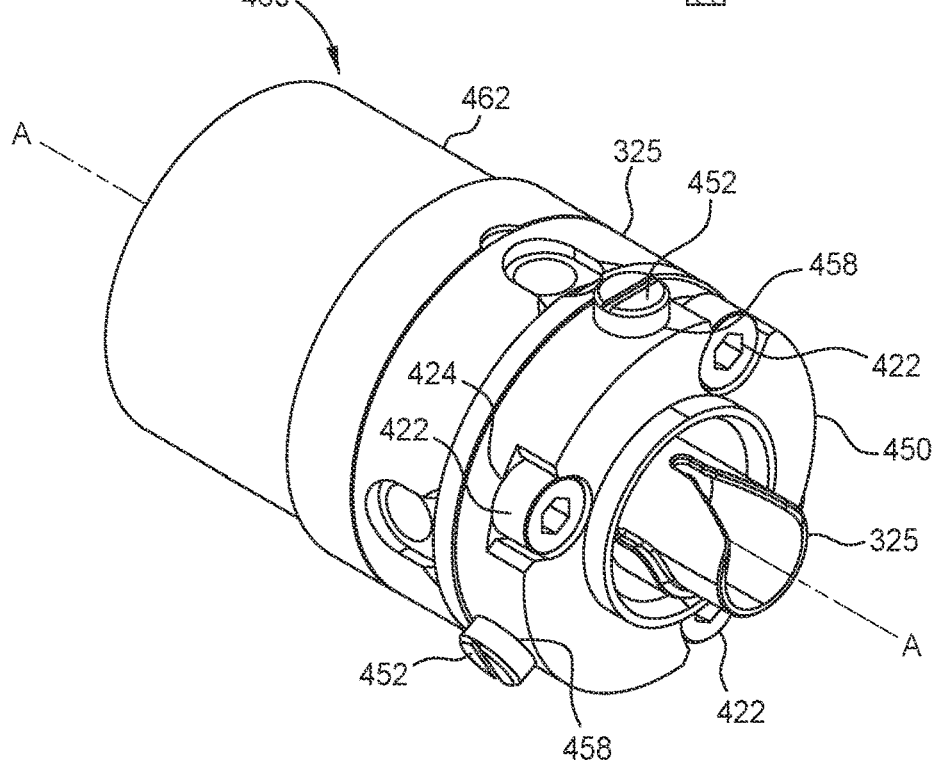
FIG. 4B illustrates a perspective view of the example optical port of FIG. 4A, in accordance with certain embodiments of the present disclosure.
Figure 4C:
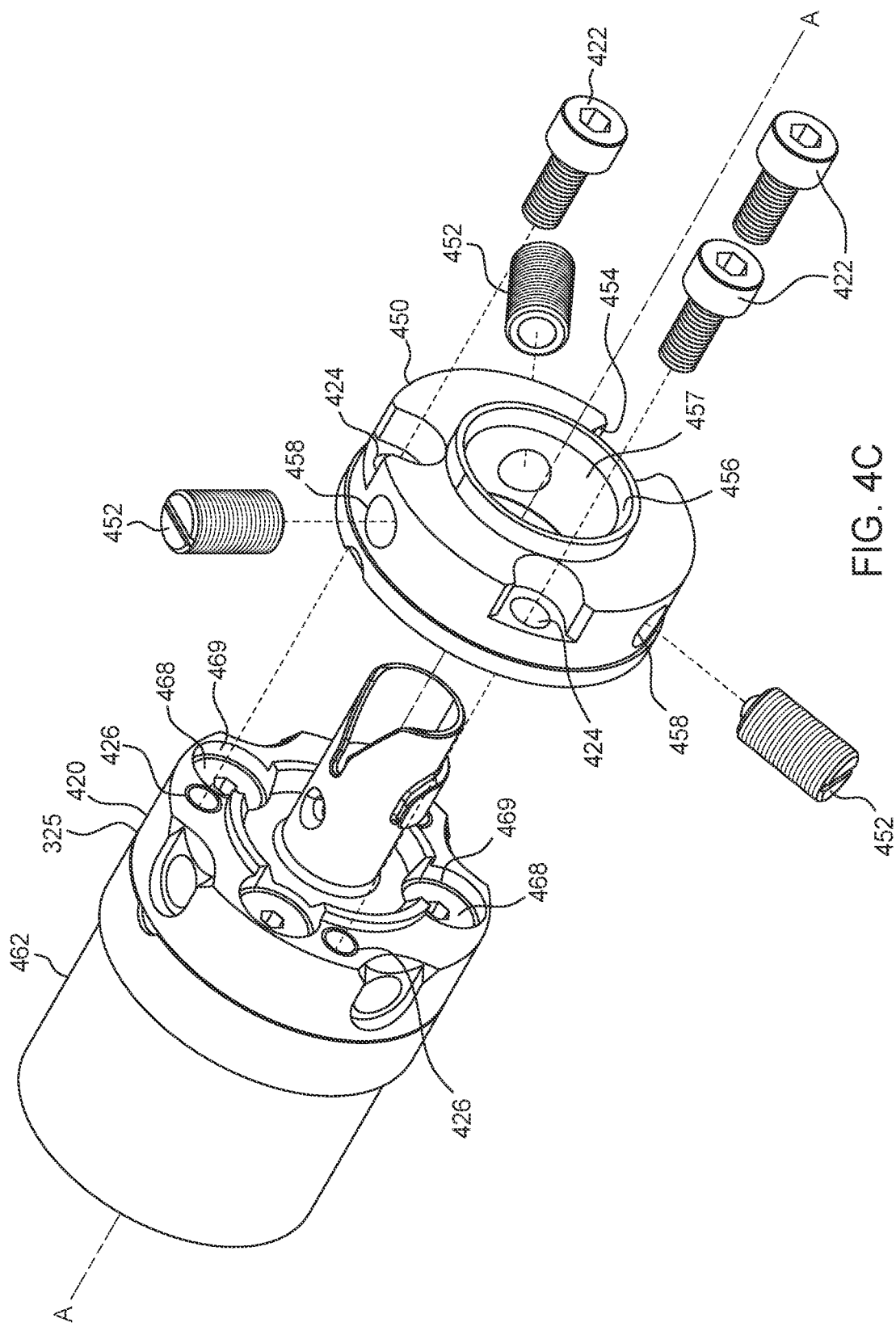
FIG. 4C illustrates a partial exploded view of the example optical port of FIG. 4A, in accordance with certain embodiments of the present disclosure.

FIGS. 4A-4C illustrate a cross-sectional side view, perspective view, and partial exploded view of optical port 330, including port adapter 325, respectively, in accordance with certain embodiments of the present disclosure. As shown in FIG. 4A, optical port 330 includes a ring-like cover plate 340 at distal end 331 thereof. Cover plate 340 may couple to an outer panel of, for example, a surgical console, and provides initial coarse lateral guidance for optical fiber connector 314 when optical fiber connector 314 is inserted into optical port 330. Accordingly, inner circumferential surface 442 of cover plate 340, which at least partially defines opening 332 of cover plate 340 through which optical fiber connector 314 is inserted, includes a tapered portion 444 that decreases in diameter proximally. In certain embodiments, tapered portion 444 extends along an entire length of inner circumferential surface 442, while in other embodiments, tapered portion 444 extends along a portion of the length of inner circumferential surface 442.

In certain embodiments, cover plate 340 includes a radio-frequency identification (RFID) device 446, such as an RFID receiver or similar device, which may be disposed along or form a proximal surface of cover plate 340. RFID device 446 may be configured to wirelessly interface (i.e., communicate) with a corresponding RFID device integrated with, for example, optical fiber connector 314 when brought in close proximity thereto. In certain embodiments, RFID device 446 may receive signals from corresponding RFID devices identifying the type of optical fiber inserted into optical port 330, for example, a multi-core fiber (MCF) or single-core fiber (SCF), the type of probe or tool inserted into optical port 330, and/or other relevant information. RFID device 446 may then relay or communicate, wired or wirelessly, the received signals to a processor or controller of the surgical laser system 202, or a processor or controller of a surgical console within which the surgical laser system 202 is integrated, for configuring the surgical laser system 202 and/or surgical console according to parameters associated with the inserted optical fiber, probe, tool, etc.

Optical port 330 further includes retention ring 450, which is disposed between cover plate 340 and base 420 of port adapter 325. Retention ring 450 includes one or more ball plungers 452 which may be circumferentially arranged around an opening 454 of retention ring 450 for detachably securing optical fiber connector 314 in optical port 330 when optical fiber connector 314 is fully inserted therein. In certain embodiments, ball plungers 452 include press fit or threaded ball plungers, which compressibly engage (i.e., mate) with one or more features (e.g., catches or indentations) formed on an outer surface of optical fiber connector 314 to retain optical fiber connector 314 in optical port 330. Accordingly, optical fiber connector 314 may be secured or unsecured from optical port 330 upon application of a requisite side force (in a proximal, "push" or distal, "pull" direction, respectively) necessary to slide the ball plunger(s) 452 out of their respective detent hole, which further provides tactile confirmation of connection or disconnection. Thus, no release latch is necessary to connect or disconnect optical fiber connector 314 with optical port 330 as insertion is captured by spring-loaded cam forces, resulting in push-to-connect, pull-to-disconnect mating. Three threaded ball plungers 452 are depicted in FIGS. 4A-4C, disposed equidistant around a circumference of opening 454. However, more or less may be utilized and spaced equidistant or non-equidistant around the circumference of opening 454. In such embodiments, threaded ball plungers 452 may be threaded or screwed into tapped holes 458 extending radially outward from opening 454 through retention ring 450. Though depicted and described with ball plungers 452, it is further contemplated that retention ring 450 may comprise other types of retention or locking mechanisms, such as spring plungers, etc.

In certain embodiments, retention ring 450 further provides additional coarse lateral guidance for optical fiber connector 314 when optical fiber connector 314 is inserted into optical port 330. Accordingly, inner circumferential surface 457 of retention ring 450 may comprise tapered portion 456, which may be distally disposed relative to locking mechanisms 452 and decrease in inner diameter proximally.

As shown in FIG. 4B-4C, retention ring 450 may be fastened to a distal surface of base 420 of port adapter 325 via one or more fasteners 422. In certain embodiments, fasteners 422 include threaded screws which may be threaded or screwed through tapped holes 424 formed through retention ring 450, and into tapped holes 426 formed in base 420. Tapped holes 424 and 426 may extend along axes parallel to a major axis A of optical port 330. Although three threaded screws 422 and tapped holes 424 are shown in FIGS. 4B-4C disposed equidistant around a circumference of retention ring 450, more or less may be utilized and spaced equidistant or non-equidistant around the circumference of retention ring 450.

A proximal surface of base 420 of port adapter 325 couples to optical assembly 460, which includes condensing lens 324 disposed within cylindrical support 462. Cylindrical support 462 generally includes one or more tubular components configured to couple to optical port 330 and secure condensing lens 324 adjacent thereto. As described above, when optical fiber connector 314 is fully inserted into optical port 330, condensing lens 324 is configured to converge one or more illumination, aiming, and/or treatment beams 311 propagated by, for example, surgical laser systems 102 and 202 into an interface at the proximal end of optical fiber 310, which is secured within ferrule 315 of optical fiber connector 314. Accordingly, support 462 comprises window 464 adjacent to base 420 of port adapter 325 through which illumination, aiming, and/or treatment beams 311 may be propagated to optical fiber 310 by condensing lens 324. Port adapter 325 may be fastened to a distal surface of optical assembly 460, for example, a distal surface of cylindrical support 462, via one or more fasteners 468, shown in FIG. 4C. Similar to fasteners 422, fasteners 468 may be threaded screws that can be threaded or screwed through tapped holes 469 formed through port adapter 325, and into tapped holes formed in cylindrical support 462.

Figure 5A:
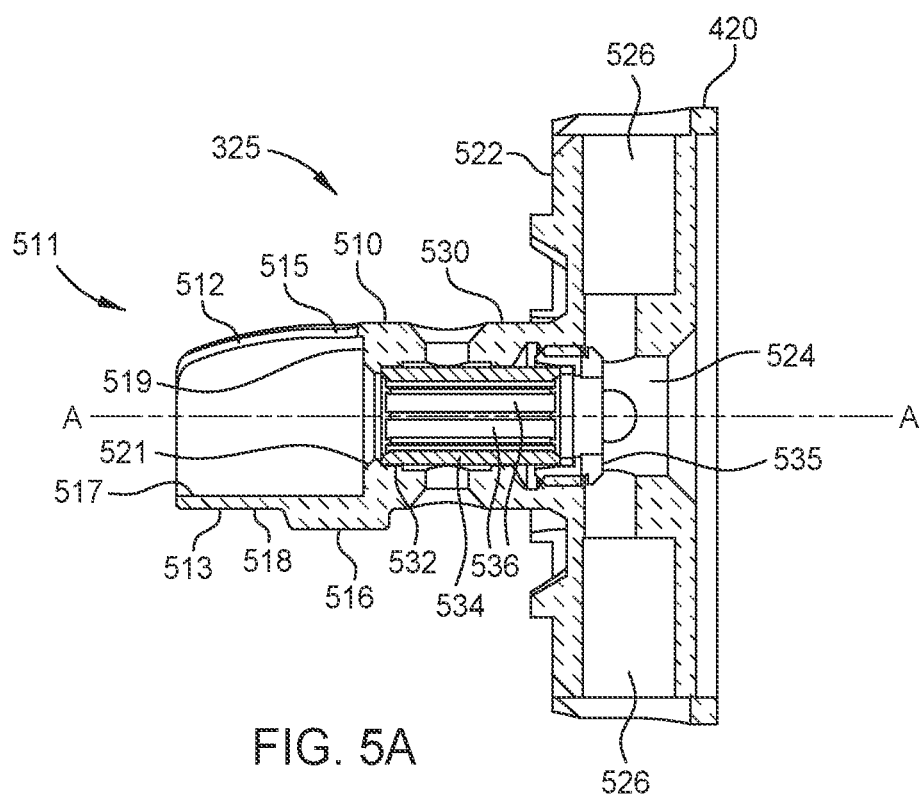
FIG. 5A illustrates a cross-sectional side view of the example port adapter of FIG. 3, in accordance with certain embodiments of the present disclosure.
Figure 5B:
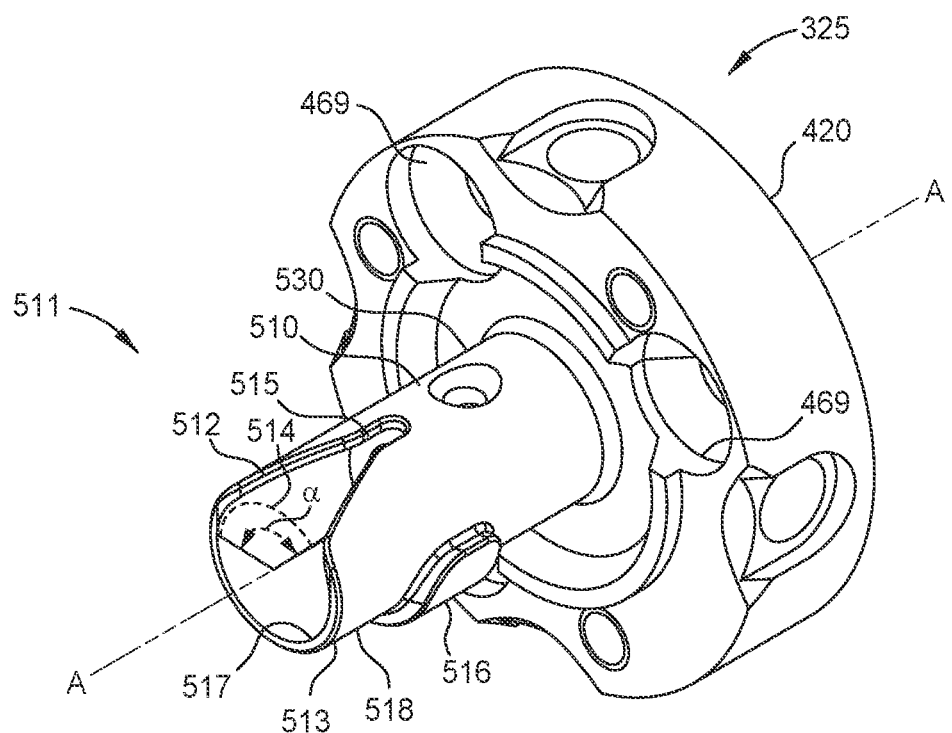
FIG. 5B illustrates a perspective view of the example port adapter of FIG. 5A, in accordance with certain embodiments of the present disclosure.

FIGS. 5A-5B illustrate a cross-sectional side view and a perspective view of port adapter 325, respectively, in accordance with certain embodiments of the present disclosure. Port adapter 325 is configured to facilitate rotational alignment of optical fiber connector 314, and thus, ferrule 315 and optical fiber 310 angularly aligned and fixed therewith, and further facilitates positioning of the proximal end of optical fiber 310 to receive incoming and converged illumination, aiming, and/or treatment beams 311 from condensing lens 324.

As shown, port adapter 325 generally includes disc-like base 420 and tubular barrel 510, which may otherwise be called a "mounting boss." Barrel 510 extends distally along major axis A of optical port 330 from a center of a distal surface 522 of base 420. Barrel 510 includes guide portion 518 at distal end 511 thereof, as well as medial portion 530 disposed between guide portion 518 and base 420. A tapered (e.g., curved) fiber cam slot 512 is formed in guide portion 518 at distal end 511 that decreases in dimensions (e.g., width) proximally along barrel 510 and transitions into axial slot 515. Port adapter 325 further includes a main clocking key 516 disposed on an outer surface 513 of guide portion 518 that is configured to mechanically engage with a main cam slot formed in an internal surface of optical fiber connector 314 (main cam slot 616, described in further detail below).

The main clocking key 516 and main cam slot 616 rotationally guide connector 314 over an angular range of approximately ±45°, including ferrule 315 and optical fiber 310 angularly aligned and fixed therewith, into a coarsely aligned rotation angle within a few degrees of the desired 0° clocking angle. As coarse clocking rotation progresses toward full connector insertion, fiber cam slot 512 is configured to then mechanically engage with a fiber key of optical fiber connector 314 (fiber key 638, described in further detail below) to finely rotate the fiber key 638 with greater precision within the last few degrees of the previously coarsely-clocked angular range, thus achieving fine alignment of a rotational angle (e.g., clocking angle) of optical fiber connector 314, and thus ferrule 315 and optical fiber 310 angularly aligned and fixed therewith, as optical fiber connector 314 is inserted into optical port 330. The fiber key 638 is rotationally guided by a proximal portion of the tapered surface of fiber cam slot 512 until it reaches the correct fine clocking angle, upon which the fiber key 638 may engage with axial slot 515, corresponding to the correct and precise clocking angle of optical fiber 310. In certain embodiments, main clocking key 516 is disposed on outer surface 513 of guide portion 518 on a side thereof opposite fiber cam slot 512, and the main cam slot 616 is disposed on inner surface of connector barrel opposite the fiber key 638 (shown in FIG. 6A).

In certain embodiments, a distal end of fiber cam slot 512 corresponds to an arc 514 of distal end 511 of barrel 510 having an arc measure α of about 120° or less, which is sufficient to provide clearance between the fiber key and distal portion of fiber cam slot 512 during the quasi-helical, guided coarse rotation provided by the engagement of the main clocking key 516 and main cam slot 616. Accordingly, in certain embodiments, a user must orient optical fiber connector 314 to within about 45° or less of a 0° clocking angle of optical fiber 310 in order for the main clocking key 516 of port adapter 325 to engage main cam slot 616 of optical fiber connector 314.

Medial portion 530 includes channel 532 through which ferrule 315 of optical fiber connector 314 is inserted during insertion of optical fiber connector 314 into optical port 330. Generally, channel 532 forms a recess for ceramic sleeve 534, which has an inner diameter tightly toleranced to an outer diameter of ferrule 315 that is lesser than an inner diameter of guide portion 518. Accordingly, a ledge 519 is formed between inner surface 517 of guide portion 518 and channel 532 of medial portion 530. Ledge 519 acts as a stop surface for a ferrule body of optical fiber connector 314 during insertion into optical port 330, described in further detail below. In certain embodiments, ledge 519 includes a tapered portion 521 that decreases in diameter proximally. In certain embodiments, tapered portion 521 extends along an entire length of ledge 519, while in other embodiments, tapered portion 521 extends along a portion of the length of ledge 519. Tapered portion 521 facilitates mechanical lateral guidance of ferrule 315 into channel 532 during insertion of optical fiber connector 314 into optical port 330. In certain embodiments, as shown in FIG. 5A, a ceramic sleeve 534 is disposed within channel 532 to provide a wear-resistant surface to precisely align ferrule 315, which may be formed of a ceramic material as well. For example, a ceramic ferrule/sleeve interface may provide improved repeatability of mating/demating between ferrule 315 and port adapter 325, for example, more than 5,000 mate/demate connections. In certain embodiments, sleeve 534 comprises a smooth inner surface, while in other embodiments, sleeve 534 includes a plurality of ribs 536.

Channel 532 leads into a volume 524 centrally formed within base 420. When fully inserted into optical port 330, a proximal end of ferrule 315 is disposed within volume 524, where illumination, aiming, and/or treatment beams 311 may be propagated by condensing lens 324 into an interface plane of the proximal end of optical fiber 310. In certain embodiments, volume 524 further functions as a probe detection window for detecting insertion of ferrule 315 and optical fiber 310 into optical port 330 to support high power (Class IV) laser safety. In such embodiments, one or more probe detection sensors of a surgical laser system and/or surgical console may be disposed radially outward of port adapter 325 with a direct line-of-sight to volume 524 via one or more detection channels 526 extending radially outward from volume 524. Accordingly, the one or more sensors may be configured to detect the presence of the proximal end of ferrule 315 in volume 524. In certain embodiments, detection of ferrule 315 in volume 524 may initiate RFID communication between for example, RFID device 446 and a corresponding RFID device in optical fiber connector 314, as well as RFID device 446 and a processor or controller of surgical laser system 202 or a surgical console within which surgical laser system 202 is integrated.

In certain embodiments, to ensure proper axial positioning of ferrule 315 within volume 524, a stop collar 535 is disposed at a proximal end of channel 532. Stop collar 535 prevents the proximal end of ferrule 315 from sliding too far into volume 524, which would result in improper axial alignment of optical fiber 310 for incoming illumination, aiming, and/or treatment beams 311 focused by condensing lens 324.

FIGS. 6A-6F illustrate a cross-sectional side view, a front perspective view, a back perspective view, a cross-sectional front view, another cross-sectional front view, and a cross-sectional perspective view of example optical fiber connector 314 of FIG. 3, including optical fiber 310, in accordance with certain embodiments of the present disclosure. Optical fiber connector 314 is attached to a proximal end of optical fiber 310 and is configured to mechanically interact or engage with the various components of optical port 330, including port adapter 325, retention ring 450, and cover plate 340, to laterally and rotationally guide optical fiber connector 314, and thus, ferrule 315 and optical fiber 310 angularly aligned and fixed therewith, during insertion of optical fiber connector 314 into optical port 330. Accordingly, optical fiber connector 314 facilitates precise alignment of optical fiber 310 with, for example, a laser beam pattern propagated by a surgical laser system and/or surgical console for improved coupling efficiency and improved power uniformity.

Figure 6A:
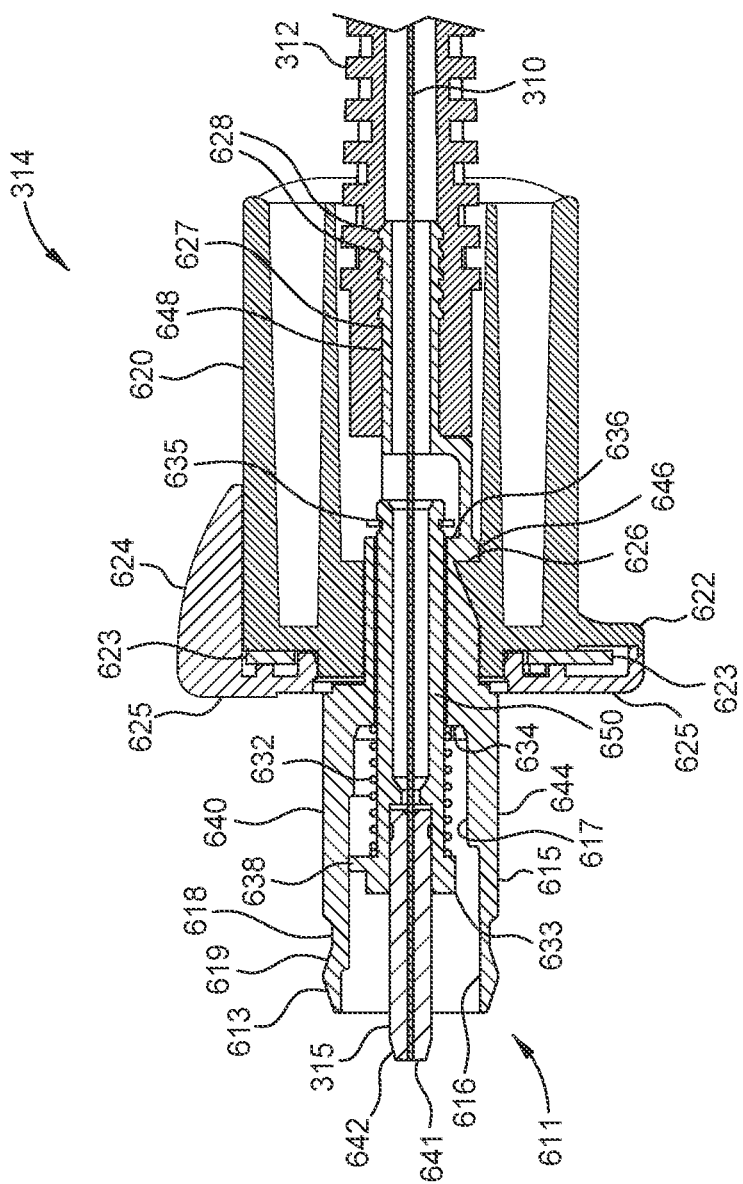
FIG. 6A illustrates a cross-sectional side view of the example optical fiber connector of FIG. 3, including a proximal end of an example optical fiber, in accordance with certain embodiments of the present disclosure.
Figure 6B:
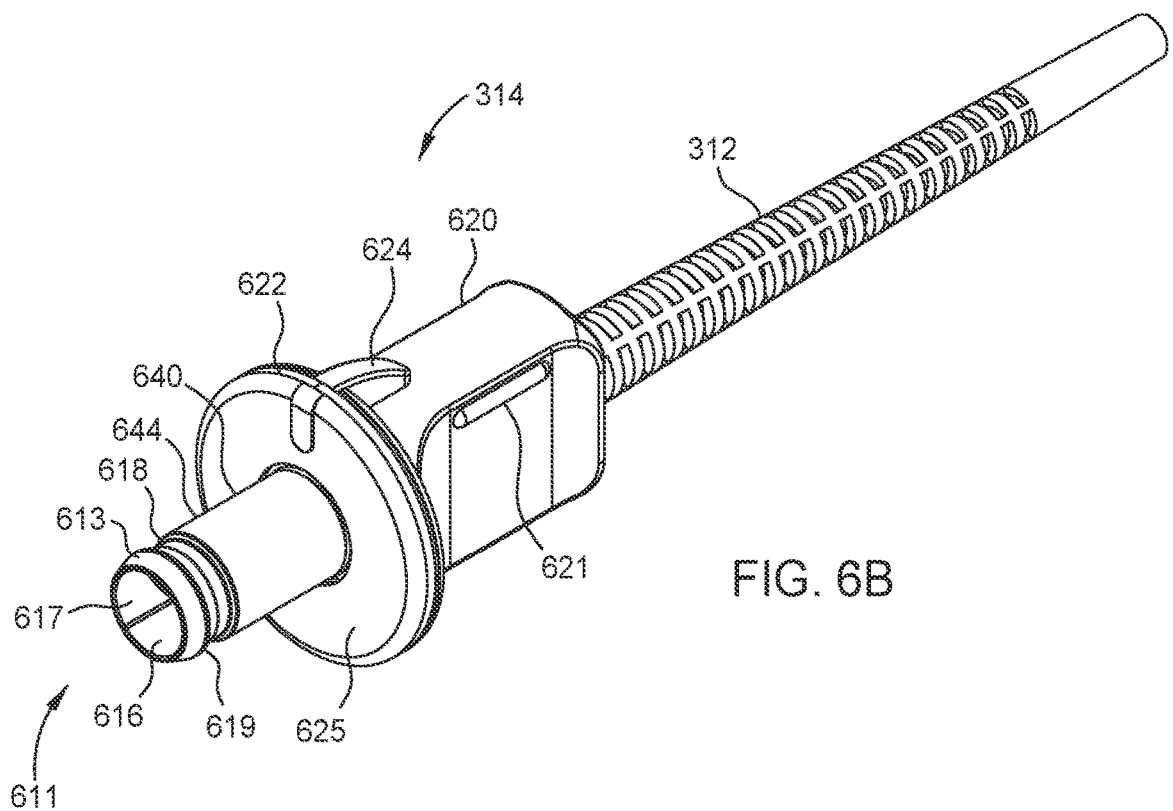
FIG. 6B illustrates a perspective view of the example optical fiber connector of FIG. 6A, in accordance with certain embodiments of the present disclosure.

As shown in FIGS. 6A-6B, optical fiber connector 314 includes a block-like gripping body 620 having an outer surface ergonomically contoured to be held by a user, such as a surgeon or surgical assistant. In certain embodiments, the outer surface thereof may be textured or have one or more gripping features formed thereon, such as one or more grooves and/or ridges 621. Gripping body 620 couples to a proximal sterility flange 622, which protects against contact of a user's surgical gloves with, for example, a non-sterile surgical laser system and/or surgical console. In certain embodiments, gripping body 620 and sterility flange 622 each include one or more snap-fit connectors configured to interlock with each other for efficient assembly of the two components.

Figure 6C:
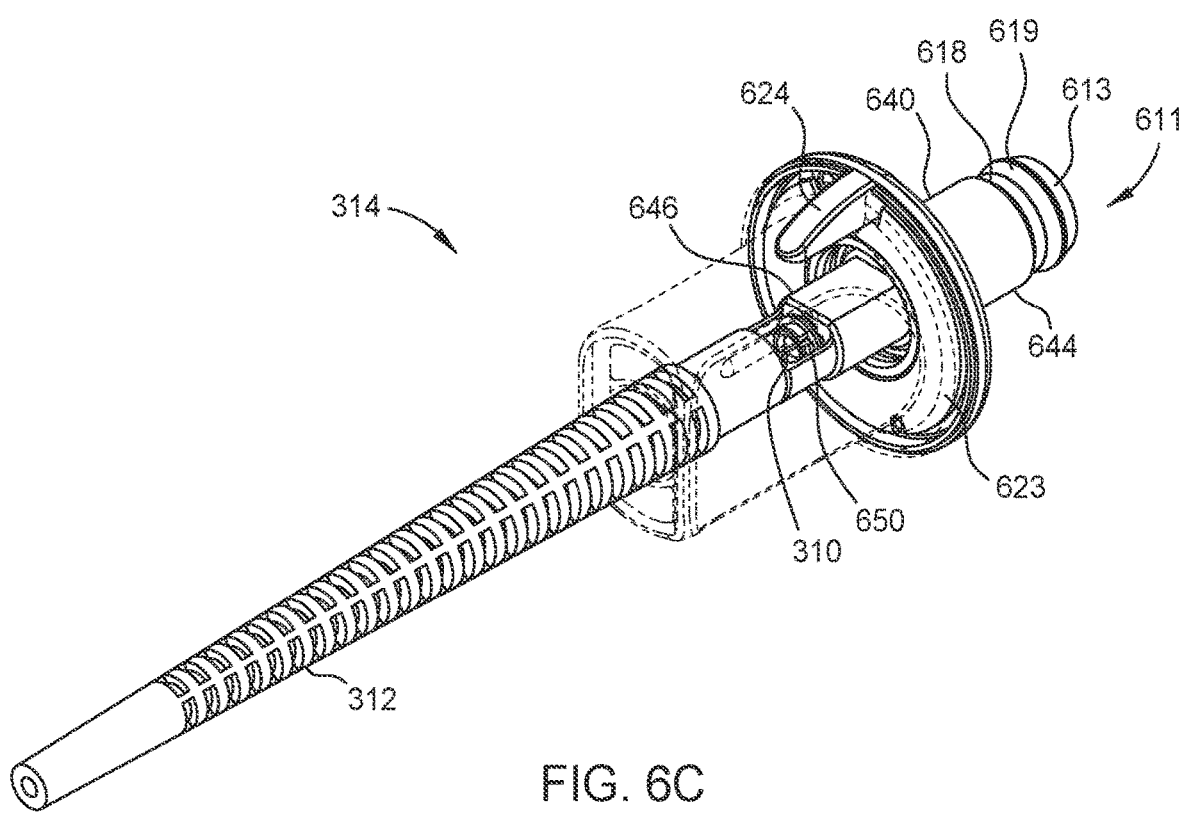
FIG. 6C illustrates another perspective view of the proximal end of the example optical fiber connector of FIG. 6A, in accordance with certain embodiments of the present disclosure.
Figure 6D:
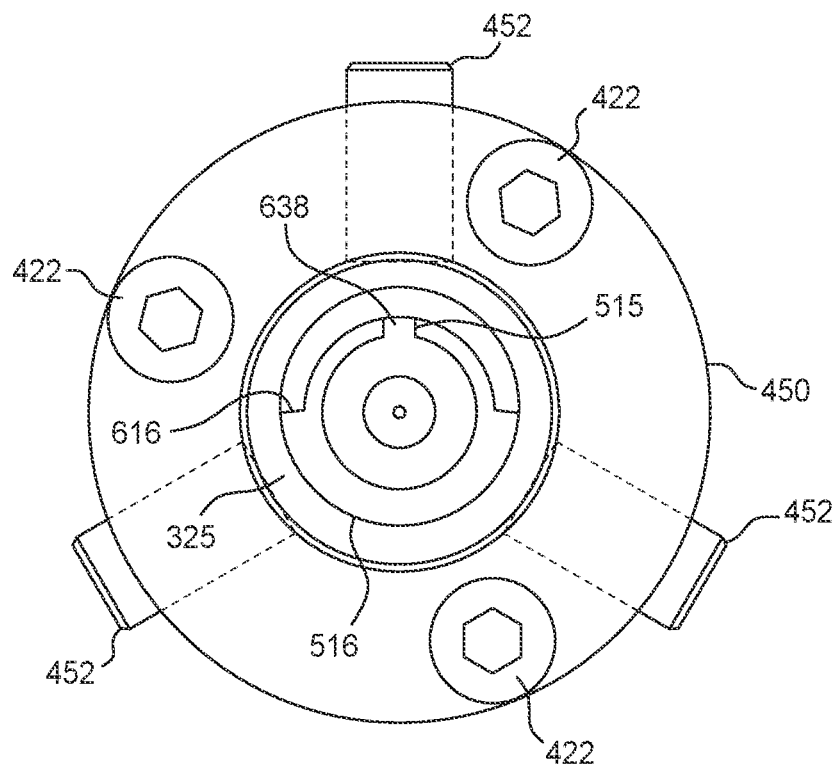
FIG. 6D illustrates a cross-sectional front view of the optical fiber connector of FIG. 6A, in accordance with certain embodiments of the present disclosure.

As shown in FIGS. 6A and 6C, in certain embodiments, sterility flange 622 includes an RFID device 623 integrated therewith for interacting with a corresponding RFID device of optical port 330. For example, in certain embodiments, RFID device 623 is an RFID transponder configured to wirelessly interact with RFID device 446 of cover plate 340. In certain embodiments, RFID device 623 may be an active-type RFID device. In certain embodiments, RFID device 623 may be a passive-type RFID device that is activated upon being brought in close proximity to, for example, RFID device 446. In certain embodiments, RFID device 623 is coupled to a cap 625, which may be snap-fit to sterility flange 622 and/or gripping body 620.

In certain embodiments, sterility flange 622 and/or cap 625 further includes an integrated visual and/or tactile marker indicating a zero clocking angle of optical fiber 310 disposed within optical fiber connector 314. Accordingly, the visual and/or tactile marker may assist a user in orienting optical fiber connector 314 for initial insertion into optical port 330. For example, in certain embodiments, a user orients the visual and/or tactile marker within approximately +/−45° relative to vertical to enable optical fiber connector 314 to be initially inserted into optical port 330, after which various features of optical fiber connector 314 and optical port 330 facilitate progressive, mechanically guided zero-angle clocking at full insertion. As shown in FIGS. 6A-6C, in certain embodiments, the integrated visual and/or tactile marker includes a prominent fin-shaped rib 624 extending distally from cap 625, through a slot in sterility flange 622, and along an outer surface of gripping body 620. In such embodiments, fin-shaped rib 624 may be molded in a contrasting color relative to a color of gripping body 620, sterility flange 622, and/or cap 625 for enhanced clarity for the user.

Optical fiber connector 314 further includes barrel member 640, which extends through gripping body 620 and proximally outward therefrom. Barrel member 640 includes an external and tubular proximal connector portion 644 configured to be inserted into optical port 330, a medial portion 646 for fixedly coupling barrel member 640 to gripping body 620, and a distal connector portion 648 for coupling optical fiber connector 314 to cable 312, which protects and connects optical fiber 310 to a surgical probe or tool. As shown in FIG. 6A, in certain embodiments, medial portion 646 may be secured to gripping body 620 via one or more snap-fit connections 626 or other retaining mechanisms. In certain embodiments, distal connector portion 648 may include one or more features 628 formed on an outer surface 627 thereof, such as one or more ridges, threads, or ribs, for securing cable 312 thereon.

In certain aspects, proximal connector portion 644, in combination with port adapter 325, retention ring 450, and cover plate 340, facilitates lateral and rotational guidance of optical fiber connector 314 during insertion thereof into optical port 330. Thus, proximal connector portion 644 includes various features formed therein that correspond with the features of the various components of the optical port 330. For example, in certain embodiments, outer surface 615 of proximal connector portion 644 includes a tapered portion 613 at proximal end 611 that increases in diameter distally. Tapered portion 613 facilitates pre-insertion and insertion axial (e.g., lateral) guidance of proximal connector portion 644 through, for example, opening 332 of cover plate 340, as well as opening 454 of retention ring 450, for improving ease of insertion of optical fiber connector 314.

Figure 6E:
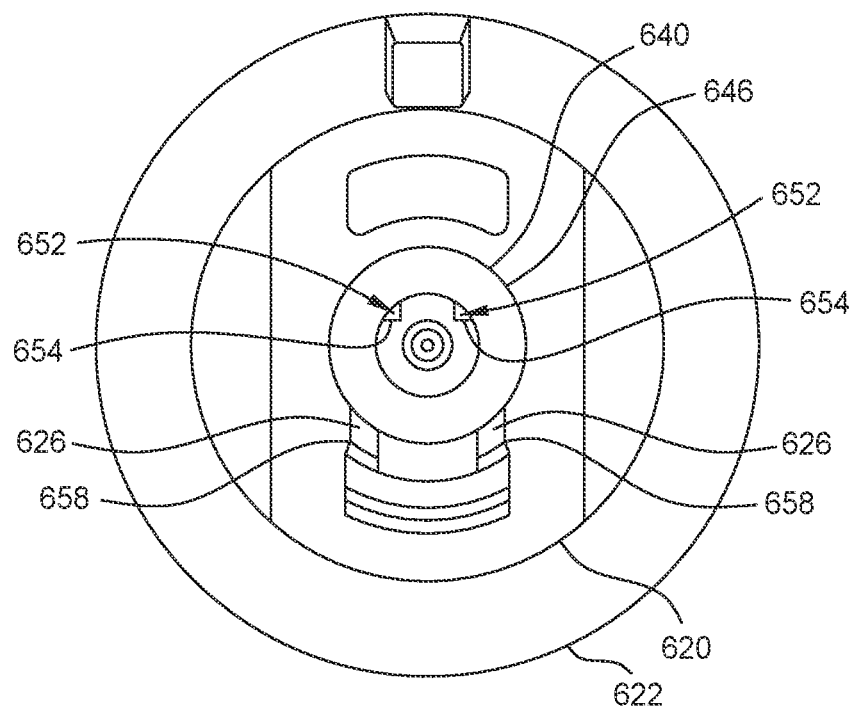
FIG. 6E illustrates another cross-sectional front view of the optical fiber connector of FIG. 6A, in accordance with certain embodiments of the present disclosure.
Figure 6F:
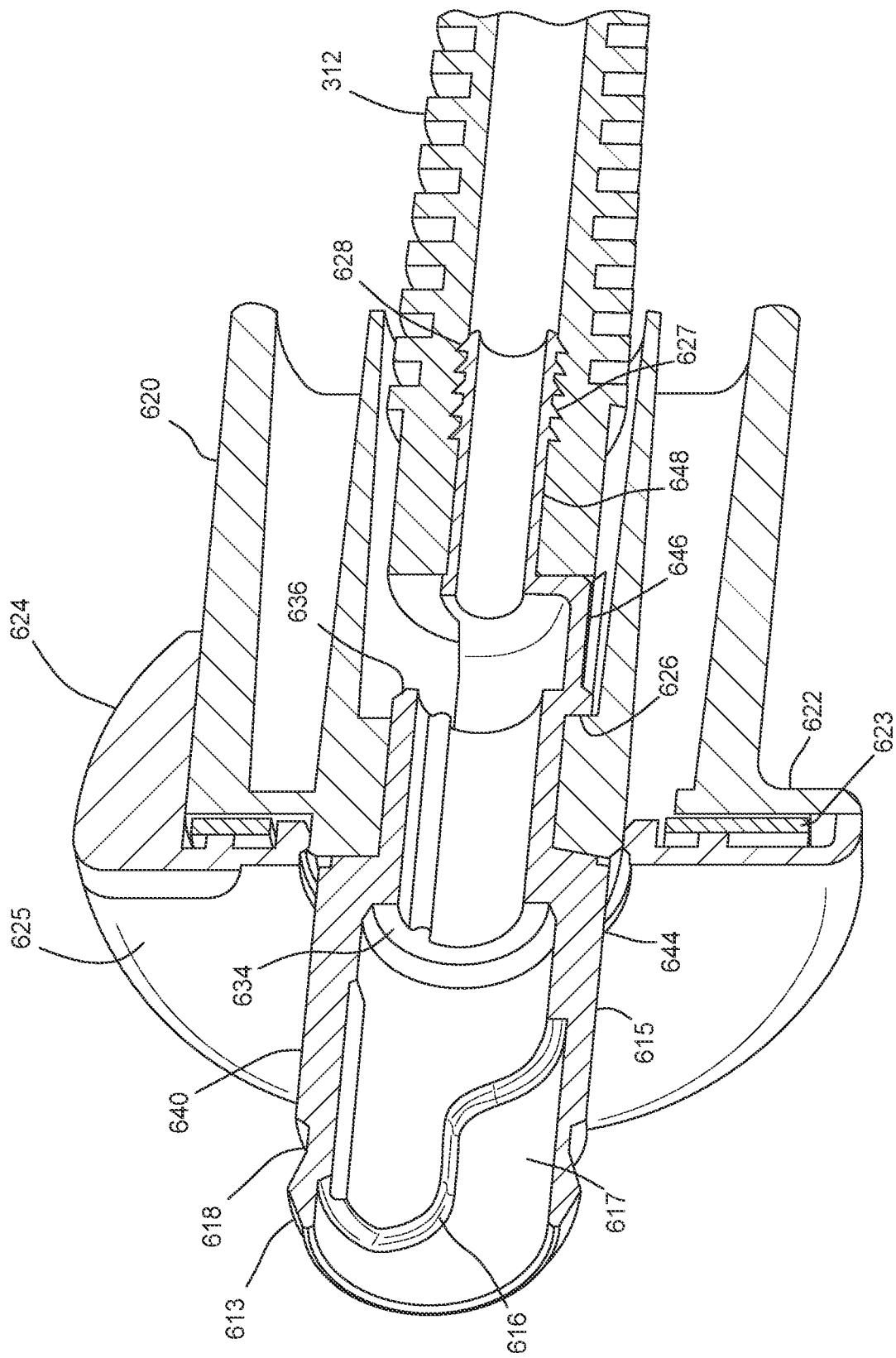
FIG. 6F illustrates a cross-sectional perspective view of the example optical fiber connector of FIG. 6A, in accordance with certain embodiments of the present disclosure.

Proximal connector portion 644 further includes tapered main cam slot 616 formed axially along an inner surface 617 thereof (shown in greater detail in FIG. 6F). Cam slot 616 engages with main clocking key 516 of port adapter 325 to provide coarse, quasi-helical guided rotation of proximal connector portion 644 for initial rotational pre-alignment of optical fiber connector 314 (and thus, optical fiber 310 angularly aligned and fixed therewith), prior to a fiber key 638 of optical fiber connector 314 engaging with fiber cam slot 512 of port adapter 325 for finer alignment. A dimension (e.g., width) of groove may correspond to an orientation of optical fiber connector 314 within about 180° or less, within about 120° or less, within about 90° or less, or within about 45° or less, of a 0° clocking angle of optical fiber 310. Accordingly, in certain embodiments, a user must orient optical fiber connector 314 to within about 90° or less of a 0° clocking angle of optical fiber 310 in order for main clocking key 516 of port adapter 325 to engage with main cam slot 616.

As described above, retention of optical fiber connector 314 within optical port 330 may be achieved by the radially inward cam force of ball plungers 452. Accordingly, proximal connector portion 644 includes a circumferential catch 618 formed in outer surface 615 thereof with which ball plungers 452 may engage via spring-loaded cam action. In certain embodiments, catch 618 is distal to tapered portion 613 and includes a conical ramp 619 having an outer diameter decreasing in the distal direction. Conical ramp 619 facilitates engagement of ball plungers 452 with catch 618, as well as final positioning of barrel member 640 (and thus, ferrule 315 and optical fiber 310 angularly aligned and fixed therewith), by providing a declined plane upon which the spring-loaded cam forces of ball plungers 452 may act against, which encourage proximal axial movement of barrel member 640 into optical port 330.

Ferrule 315 is substantially cylindrical in shape and secures the proximal end of optical fiber 310 therein at proximal end 611 of optical fiber connector 314. Ferrule 315 facilitates correct positioning of an interface plane of the proximal end of optical fiber 310 within volume 524 such that condensing lens 224 may focus illumination, aiming, and/or treatment beams 311 therein. A proximal end 641 of ferrule 315 includes a tapered portion 642 that increases in diameter distally. Tapered portion 642, in combination with tapered portion 520 of port adapter 325, facilitates easier insertion of ferrule 315 into channel 532 of port adapter 325. In certain embodiments, ferrule 315 is formed of a ceramic material similar to that of sleeve 534, which may reduce wear on ferrule 315 and sleeve 534 for improved repeatability of mating/demating between ferrule 315 and port adapter 325.

Ferrule 315 is supported within an interior of proximal connector portion 644 via cylindrical ferrule body 650, to which ferrule 315 is fixedly coupled. As shown in FIGS. 6A-6B, ferrule 315 extends from a proximal end of ferrule body 650, which is slidably coupled, but not rotationally coupled, to medial portion 646 and extends into proximal connector portion 644. Accordingly, an inner diameter of medial portion 646 is tightly toleranced to an outer diameter of ferrule body 650. In certain embodiments, an axial spring 632 is disposed around ferrule body 650 between the proximal end of ferrule body 650 and medial portion 646. Spring 632 provides axial spring-loaded force on ferrule body 650 in the proximal direction to facilitate correct positioning of ferrule 315 within volume 524 when optical fiber connector 314 is connected to optical port 330. Spring 632 may be supported between a flange 633 at the proximal end of ferrule body 650 and a proximal wall 634 of medial portion 646. To prevent ferrule body 650 from sliding out of proximal connector portion 644 as a result of the axial force from spring 632, a retaining clip 635 may be attached on a distal end of ferrule body 650, which catches against medial wall 636 within medial portion 646.

During insertion of optical fiber connector 314 into optical port 330, axial registration and retention of optical fiber connector 314 is achieved by the cam force of ball plungers 452 against conical ramp 619 axially displacing proximal connector portion 644 past a point of axial registration of ferrule 315. This causes spring 632 to slightly compress and ferrule 315 to slightly retract axially. The axial overtravel for the displaced axial position of proximal connector portion 644 coincides with ball plungers 452 being near the bottom of conical ramp 619, which is achieved by the ball plungers 452 pushing radially inward with enough axial cam force on conical ramp 619 to overcome the resistance force of spring 632 plus any ferrule 315 or sleeve 534 friction. Further, the location of probe-detection sensors within optical port 330 corresponds to the axial distance between proximal end 641 of ferrule 315 and conical ramp 619. The probe-detection sensors sense the presence of the ferrule 315 only within the axial range of positions where the insertion capture forces are engaged by spring-loaded cam action, i.e., when conical ramp 619 is engaged by ball plungers 452.

As a result of the above, the optical fiber connector 314 and optical port 330 provide: sufficient axial retention force for reliability with acceptable usability of the push/pull mate/demate function thereof; detection of ferrule 315 only within insertion capture to ensure that detection thereof indicated complete engagement of optical fiber connector 314 with optical port 330; a minimized insertion distance for optical fiber connector 314 into optical port 330, thus resulting in an overall form factor with compact axial length; a minimized overtravel distance for ferrule 315, which avoids excessive compression of optical fiber 310 due to the compliant spring-loaded axial registration of ferrule 315 during insertion capture; and, distances compatible with RFID devices and related sensors.

Returning now to FIG. 6A, ferrule body 650 includes fiber key 638 extending from flange 633 at the proximal end of ferrule body 650. During insertion of optical fiber connector 314 into optical port 330, and more particularly, during insertion of ferrule 315 into channel 532 of port adapter 325 (and after initial, coarse rotational alignment via main cam slot 616 and main clocking key 516) over a range of approximately ±45°, fiber key 638 engages with fiber cam slot 512 formed in barrel 510 of port adapter 325, which causes fiber key 638 to finely rotate within the final few degrees after coarse clocking to a precise clocking angle for optical fiber 310 due to its tapered surface. Thereafter, fiber key 638 may slide into axial slot 515, which corresponds to the correct precision clocking angle for optical fiber 310 and has dimension (e.g. width) closely toleranced to a dimension of fiber key 638. FIG. 6C illustrates a cross-sectional front view of optical fiber connector 314 within optical port 330 when fiber key 638 is engaged with axial slot 515. As shown, rotational and lateral alignment of optical fiber connector 314 and thus, ferrule 315 and optical fiber 310 angularly aligned and fixed therewith, is facilitated by coarse mechanical guidance of main clocking key 516 as provided by main cam slot 616 of optical fiber connector 314, in addition to the finer guidance of fiber key 638 as provided by fiber cam slot 512 and axial slot 515.

To facilitate clocking of optical fiber 310 by rotation of optical fiber connector 314, ferrule 315, and thus optical fiber 310 secured therein, is angularly aligned and angularly fixed with optical fiber connector 314. Angular fixation of ferrule 315 and optical fiber 310 within optical fiber connector 314 is enabled via one or more axial ridges 652 formed on an inner surface of medial portion 646 of barrel member 640, which further correspond and engage with axial grooves 654 formed in ferrule body 650, thus creating a tongue-and-groove-like mechanism as shown in FIG. 6E. The axial ridges 652 and axial grooves 654 function as anti-rotation feature to prevent rotation of ferrule body 650 and ferrule 315 relative to barrel member 640, while still allowing axial movement thereof. Similarly, to prevent rotation of barrel member 640 relative to, for example, gripping body 620, medial portion 646 may also include an anti-rotation feature, such as the snap-fit connections 626 described above, which may correspond with one or more slots 658 formed in gripping body 620.

FIGS. 7A-7H illustrate cross-sectional side views of optical port 330, including port adapter 325, and optical fiber connector 314 at sequential stages of mating, in accordance with certain embodiments of the present disclosure. Accordingly, FIGS. 7A-7H illustrate unique operational and functional characteristics of the optical port-optical fiber connector interface during mating, which provides progressive, mechanically guided lateral positioning and rotation during insertion, as well as captured-state detection and RFID communication.

Figure 7A:
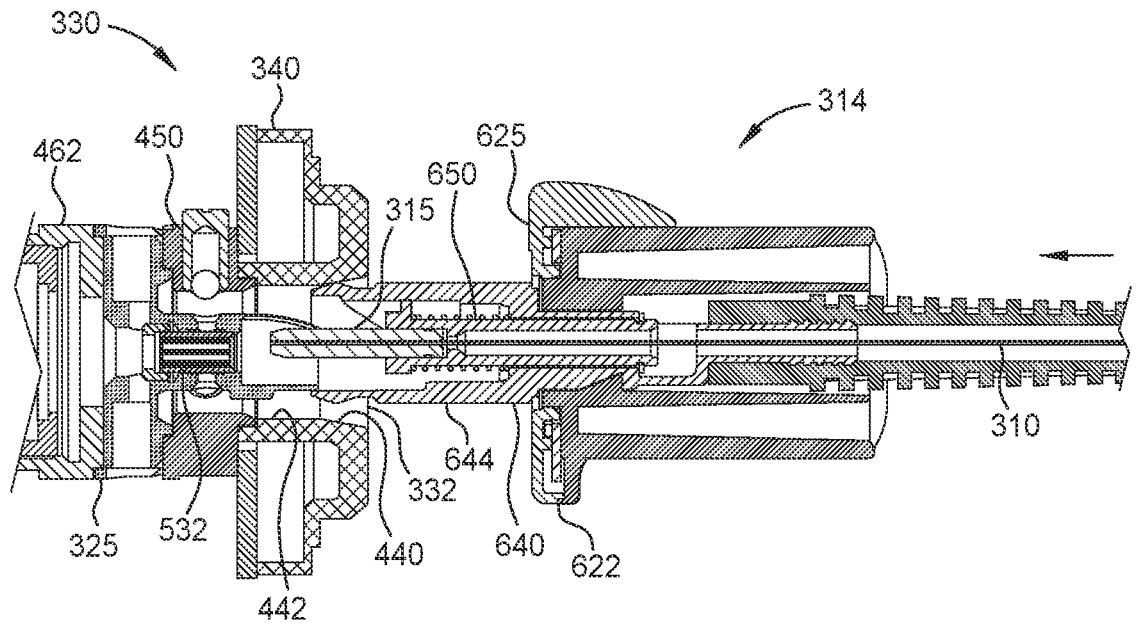
FIGS. 7A-7H illustrate cross-sectional side views of the example optical port, including the port adapter, and optical fiber connector of FIG. 3 at different stages of mating, in accordance with certain embodiments of the present disclosure.
Figure 7B:
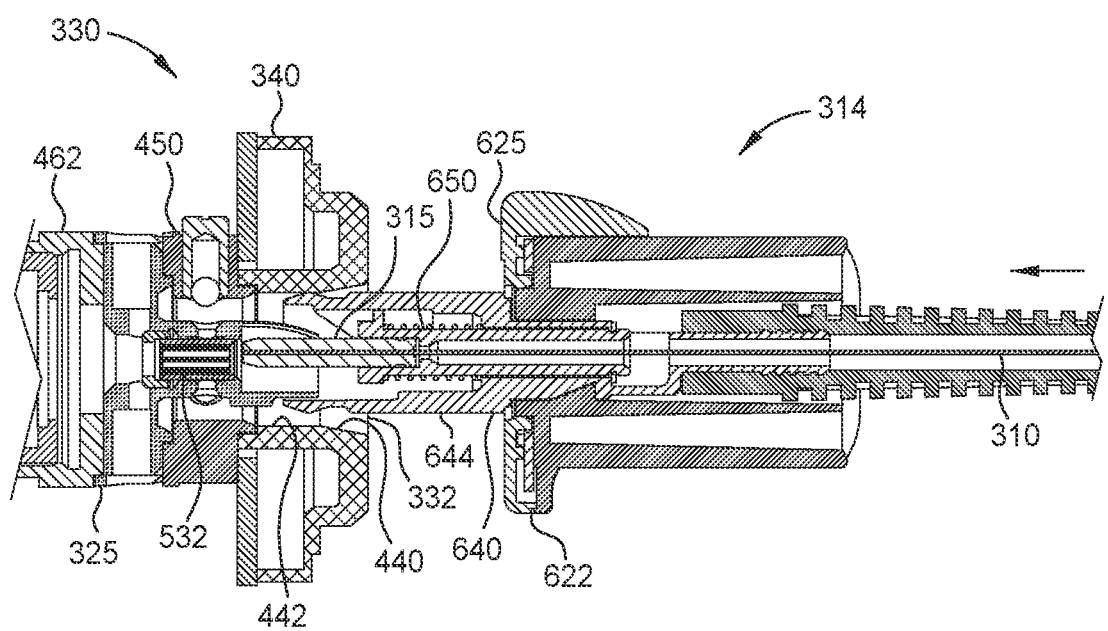

FIGS. 7A-7B illustrate a pre-insertion sequence, wherein optical fiber connector 314 is coarsely positioned laterally prior to insertion of ferrule 315 into channel 532 of port adapter 325. In FIG. 7A, a user begins inserting optical fiber connector 314 into optical port 330 by guiding proximal connector portion 644 of barrel member 640 through opening 332 of cover plate 340, which may be a coupled to an outer panel of a surgical laser system and/or surgical console. Prior to or during pre-insertion, the user orients optical fiber connector 314 to within about +/−45° of a 0° clocking angle of optical fiber 310, which is designated by a visual and/or tactile marker on optical fiber connector 314, for example, on sterility flange 622 and/or cap 625. As proximal connector portion 644 is passed through cover plate 340, the inner circumferential surface 442 of cover plate 340, which includes tapered portion 444, provides coarse mechanical guidance prior to proximal connector portion 644 contacting port adapter 325. In FIG. 7B, proximal connector portion 644 passes tapered portion 444 of cover plate 340 and coarse mechanical position of proximal connector portion 644 is completed.

Figure 7C:
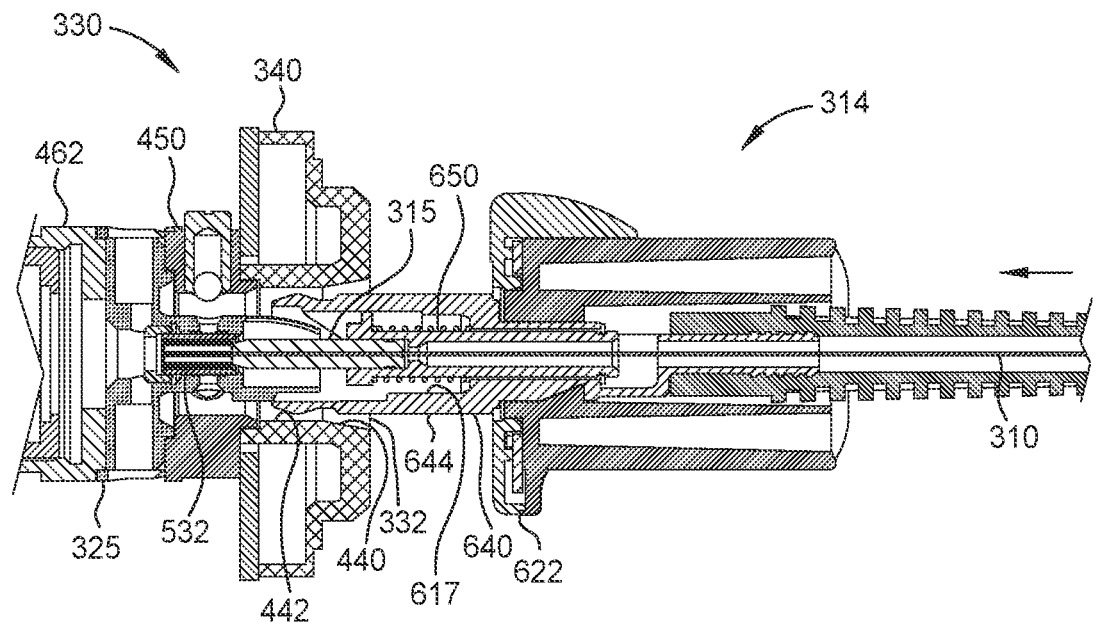

FIG. 7C illustrates a barrel centering sequence. As shown, inner surface 617 of proximal connector portion 644 contacts outer surface 513 of barrel 510 of port adapter 325, which mechanically guides proximal connector portion 644 as it moves proximally for radial positional alignment of ferrule 315 prior to insertion thereof into channel 532.

Figure 7D:
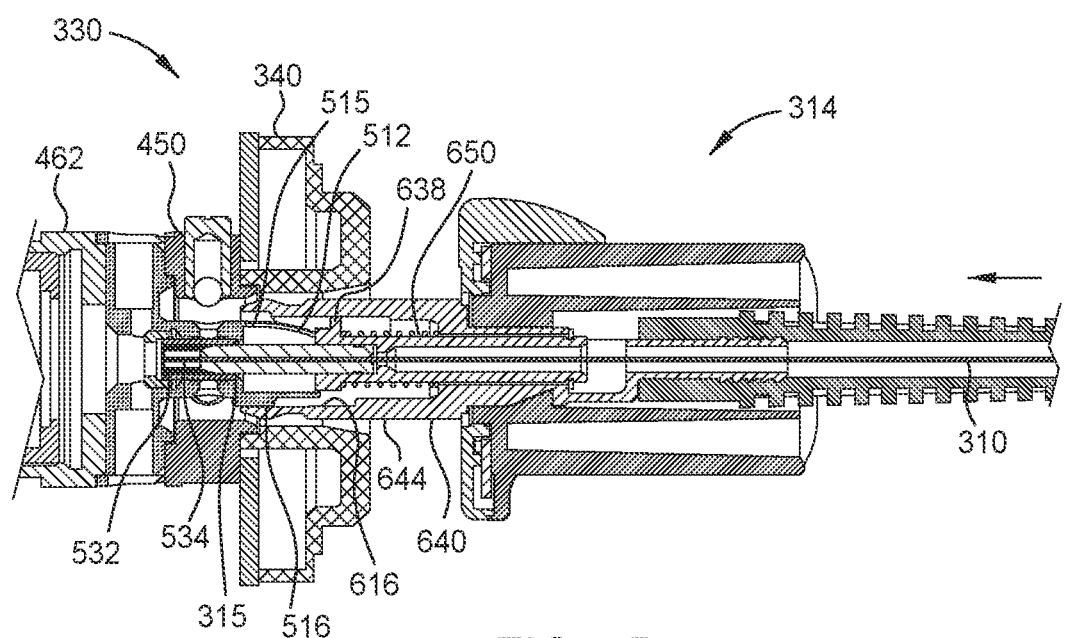
Figure 7E:
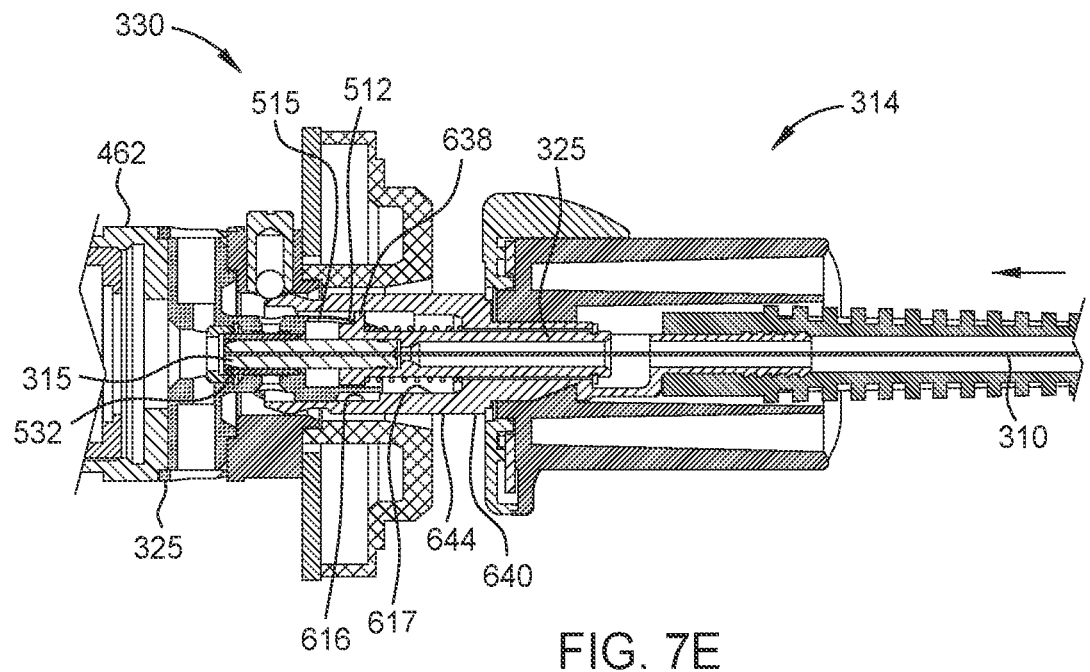

FIGS. 7D-7E illustrate a barrel clocking sequence, wherein proximal connector portion 644 of optical fiber connector 314 and ferrule body 650 disposed therein are further rotationally adjusted, beyond initial user clocking, as optical fiber connector 314 is moved proximally. In FIG. 7D, ferrule 315 is inserted into sleeve 534 disposed within channel 532. Coarse clocking alignment of proximal connector portion 644 begins as main clocking key 516 on barrel 510 of port adapter 325 contacts and slides against a curved edge of main cam slot 616 in proximal connector portion 644. In FIG. 7E, the mechanical guidance provided by main clocking key 516 and main cam slot 616 facilitates alignment of fiber key 638 on ferrule body 650 for insertion into fiber cam slot 512 in port adapter 325. As the user further moves optical fiber connector 314 in the proximal direction, fiber key 638 contacts and slides against a curved surface of fiber cam slot 512, which provides additional, finer clocking of proximal connector portion 644. Clocking may be completed upon fiber key 638 aligning with and sliding into axial slot 515, which fiber cam slot 512 transitions into proximally.

During the sequence in FIGS. 7D-7E, tapered portion 613 in outer surface 615 of proximal connector portion 644 contacts the balls of ball plungers 452 in retention ring 450 and provides increasing force thereon as optical fiber connector 314 is guided into optical port 330. Accordingly, the balls of ball plungers 452 slide radially outward and out of their respective detent holes. This contact between proximal connector portion 644 and ball plungers 452 may provide tactile confirmation to the user that a capture sequence for optical fiber connector 314, as described below, is being initiated.

Figure 7F:
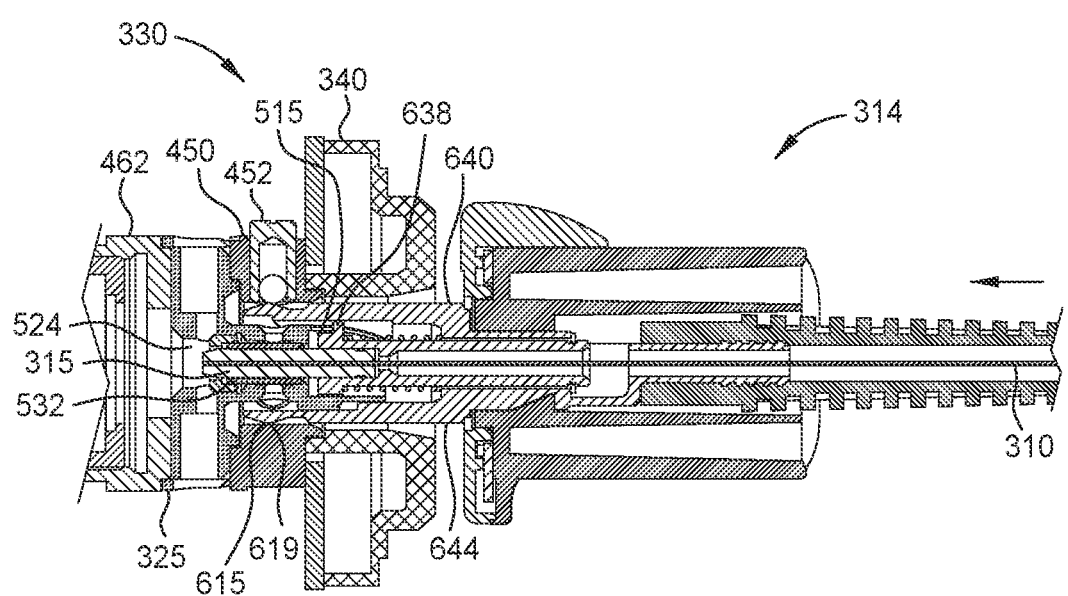
Figure 7G:
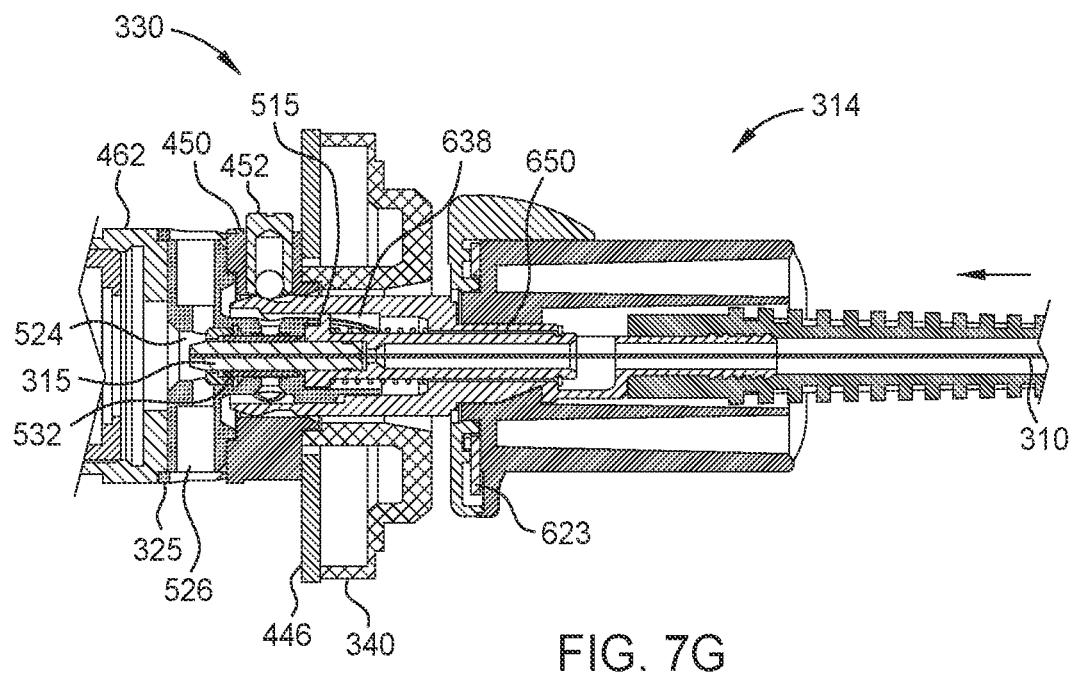
Figure 7H:
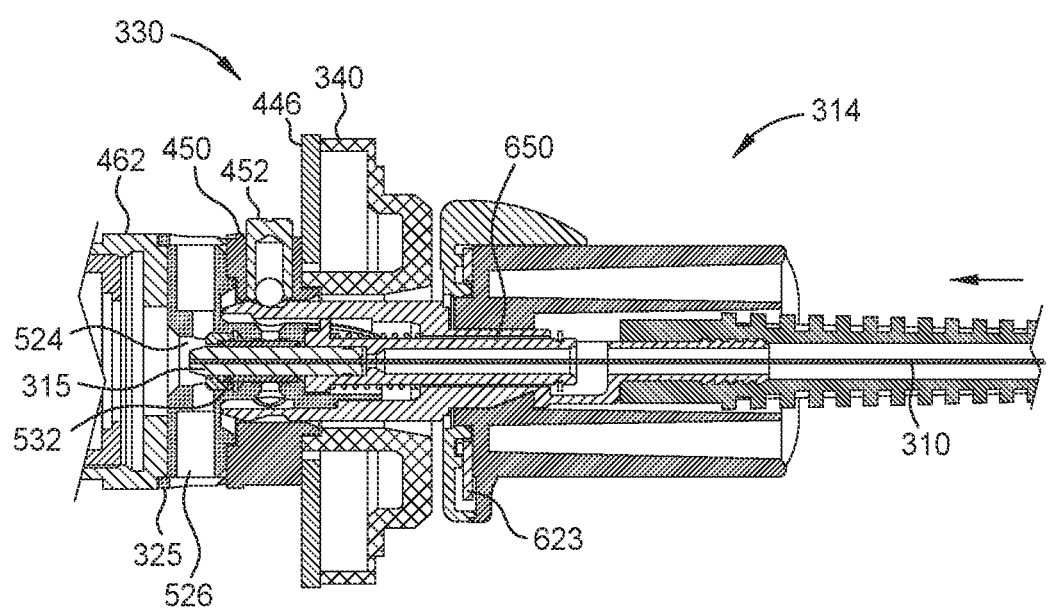

FIGS. 7F-7H illustrate the capture sequence, wherein proximal connector portion 644 is fully inserted into optical port 330 and engages with ball plungers 452. At the start of the capture sequence in FIG. 7F, the spring-loaded ball plungers 452 provide cam force on conical ramp 619 in outer surface 615 of proximal connector portion 644. The downward cam force against the declined surface of conical ramp 619 creates a capture force in the axial and proximal direction, causing proximal connector portion 644, and thus, optical fiber connector 314, to be pulled further into optical port 330. In FIG. 7G, ferrule 315 passes through a proximal end of channel 532 and enters volume 524, where it reaches a final position in which condensing lens 324 may a focus illumination, aiming, and/or treatment beams 311 into a proximal interface plane of optical fiber 310 with precise alignment and high coupling efficiency. In this final position, clocking of optical fiber 310 is completed, as fiber key 638 is fully inserted into axial slot 515, which also completes axial registration of ferrule body 650 within optical port 330. Additionally, in this final insertion position, ferrule 315 blocks an optical path through detection channels 526, thereby signaling to one or more probe-detection sensors the presence of ferrule 315 in its final insertion position. In certain embodiments, in response to detection of ferrule 315 in volume 524, RFID communication between RFID devices 446 and 623 in optical port 330 and optical fiber connector 314, respectively, may be initiated. In FIG. 7H, cam force provided by ball plungers 452 continues to pull proximal connector portion 644 into optical port 330, providing spring-loaded axial registration of ferrule body 650 against ledge 519 of port adapter 325, which acts as a stop surface. As a result, insertion of optical fiber connector 314 into optical port 330 is completed.

Figure 8A:
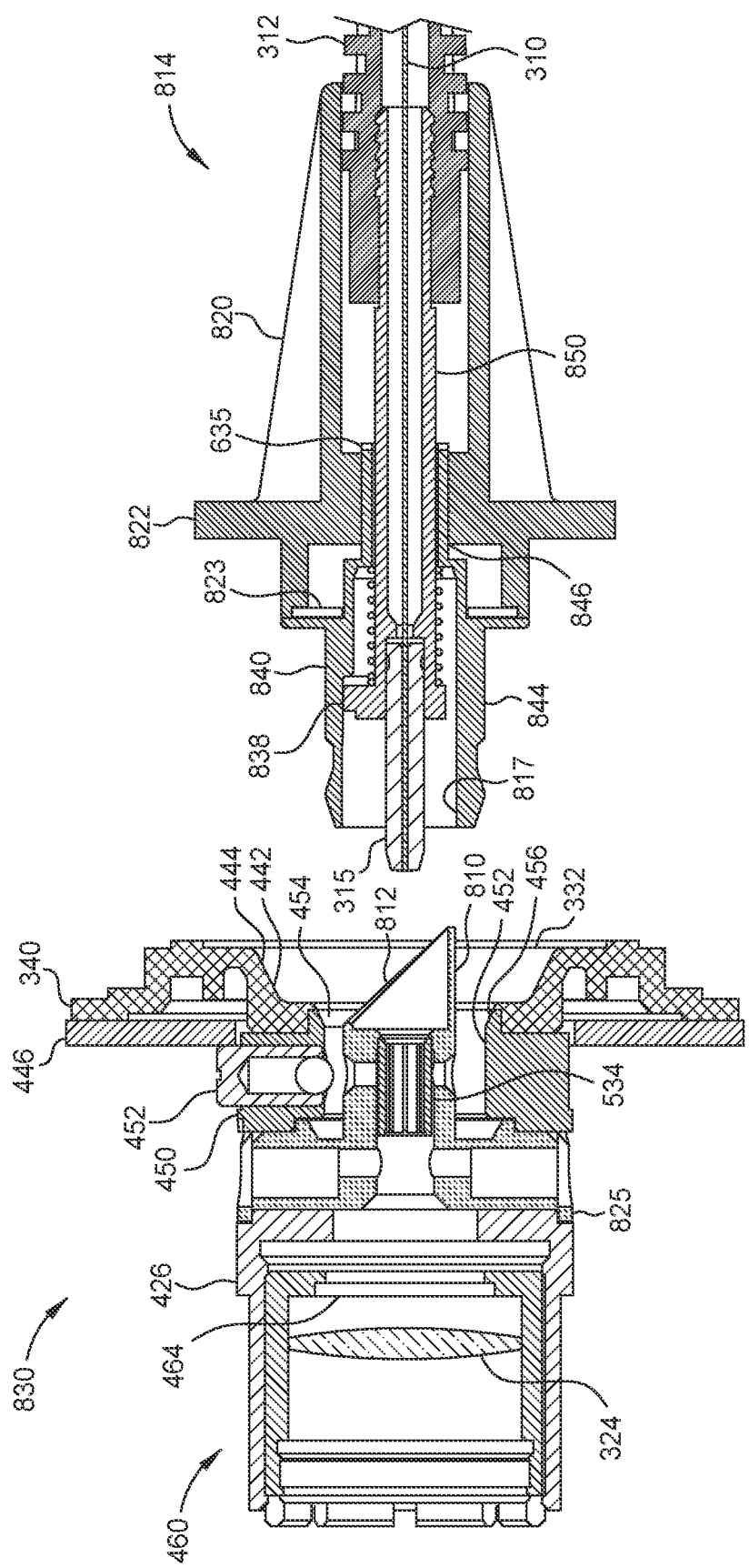
FIGS. 8A-8B illustrate cross-sectional side views of another example optical port of a surgical laser system, including another example port adapter, and another example optical fiber connector in an unmated and a mated state, respectively, in accordance with certain embodiments of the present disclosure.
Figure 8B:
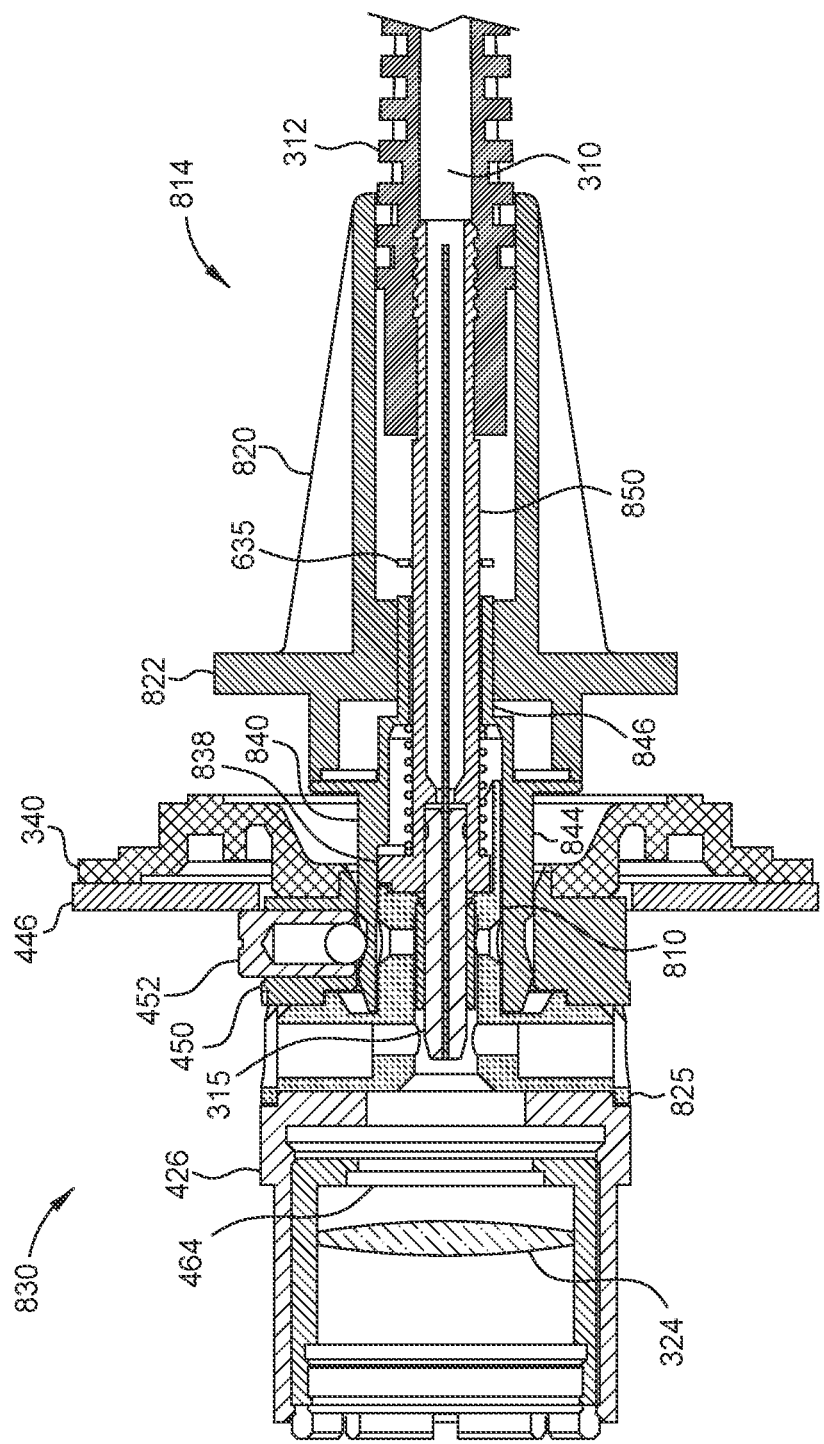
Figure 9:
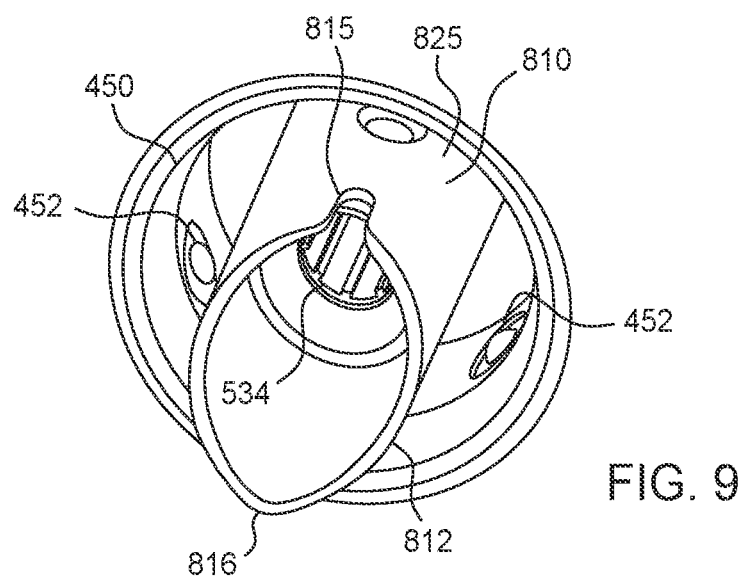
FIG. 9 illustrates a perspective view of the example port adapter of FIG. 8, in accordance with certain embodiments of the present disclosure.
Figure 10A:
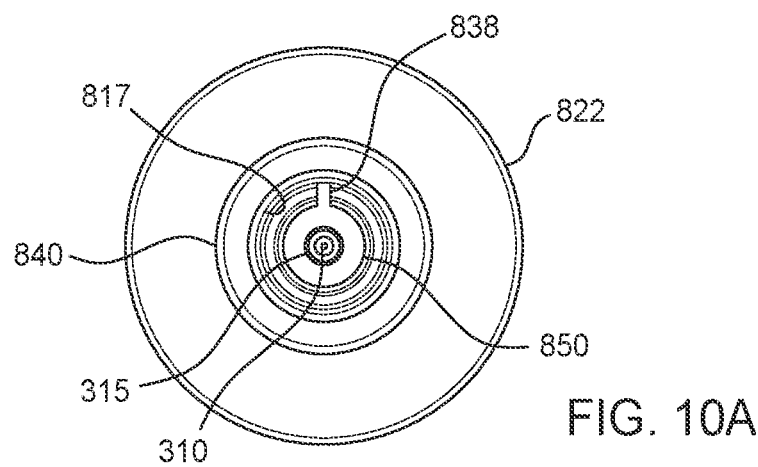
FIG. 10A illustrates a front view of the example optical fiber connector of FIG. 8, in accordance with certain embodiments of the present disclosure.
Figure 10B:
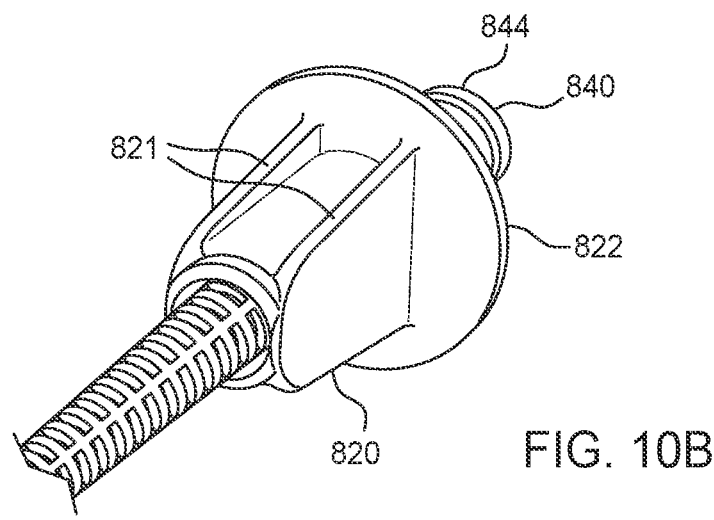
FIG. 10B illustrates a perspective view of a proximal end of an example optical fiber, including the example optical fiber connector of FIG. 8, in accordance with certain embodiments of the present disclosure.

FIGS. 8A-8B illustrate cross-sectional side views of another example optical port 830 of a surgical laser system, including another example port adapter 825, and another example optical fiber connector 814 in an unmated and a mated state, respectively, in accordance with certain embodiments of the present disclosure. FIG. 9 illustrates a perspective view of port adapter 825, and FIGS. 10A-10B illustrate a front view and a perspective view of optical fiber connector 814, respectively, in accordance with certain embodiments of the present disclosure. For clarity, FIGS. 8A-8B, FIG. 9, and FIGS. 10A-10B are herein described together. Further, optical port 830, including port adapter 825, and optical fiber connector 814 are substantially similar to optical port 330 and optical fiber connector 314, respectively. Therefore, corresponding details are omitted for brevity.

The examples of FIGS. 8A-8B, FIG. 9, and FIGS. 10A-10B may be described as "self-clocking" examples, as no pre-insertion clocking of optical fiber connector 814, and therefore, optical fiber 310 secured therein, is necessary by the user when coupling optical fiber connector 814 to optical port 830. To facilitate self-clocking, barrel member 840, including proximal connector portion 844 and medial portion 846, as well as ferrule body 850 and cable 312 coupled to either barrel member 840 or ferrule body 850, are freely and independently rotatable within optical fiber connector 814. As shown in FIGS. 8A-8B, ferrule body 850 and medial portion 846 of barrel member 840, and medial portion 846 and gripping body 820 are rotatably coupled to each other (e.g., without any anti-rotation features, such as ridges and grooves), unlike the corresponding features of optical fiber connector 314. Additionally, inner surface 817 of proximal connector portion 844 does not have any cam features formed therein, and may instead be substantially smooth. Accordingly, pre-insertion and insertion of optical fiber connector 814 into optical port 830 is possible at any angle of optical fiber connector 814 and without any external rotation thereof by the user or components of optical port 830, as barrel member 840 and ferrule body 850 may freely rotate internally within optical fiber connector 814, thereby simplifying the insertion process.

To account for the free-rotation of ferrule body 850 and barrel member 840, and thus, the possibility of inserting optical fiber connector 814 into optical port 830 at any angle, barrel 810 of port adapter 825 includes a substantially helical tapered leading edge 812, as shown in FIG. 9. Tapered leading edge 812 begins at distal tip 816 of barrel 810 and helically tapers or curves in the proximal direction until it transitions into axial slot 815. Similar to axial slot 515, axial slot 815 corresponds with a desired final clocking angle of ferrule body 850 and thus, ferrule 315 angularly aligned and fixed with ferrule body 850. During insertion, tapered leading edge 812 is configured to mechanically engage with fiber key 838 (shown in FIGS. 8A-8B and FIG. 10A) formed on ferrule body 850 to gradually rotate ferrule body 850, from any starting rotational (e.g., angular) orientation, as optical fiber connector 814 is inserted into optical port 830. The fiber key is rotationally guided by tapered leading edge 812 until it reaches and engages axial slot 815, which precisely corresponds to the correct clocking angle of optical fiber 310.

As shown in FIG. 10B, optical fiber connector 814 includes the gripping body 820, which may have a substantially round morphology as opposed to the block-like shape of gripping body 620. This round morphology may facilitate the free-rotation of ferrule body 850, barrel member 840, as well as cable 312 extending distally therefrom. In certain embodiments, similar to gripping body 620, gripping body 820 may have one or more gripping features formed thereon, such as extensions 821, to facilitate ergonomic gripping by the user. Gripping body 820 transitions proximally into sterility flange 822, which protects against contact of a user's surgical gloves with, e.g., a non-sterile surgical laser system and/or surgical console. Since ferrule body 850 and thus, ferrule 315 are freely rotatable within optical fiber connector 814, neither gripping body 820 nor sterility flange 822 include any visual and/or tactile markers for indicating a zero clocking angle of optical fiber 310.

Similar to optical fiber connector 314, an RFID device 823 is integrated with optical fiber connector 814 for wireless interaction with a corresponding RFID device of optical port 830, e.g., RFID device 446. For example, in certain embodiments, RFID device 823 is integrated in sterility flange 822. In certain other embodiments, as shown in FIGS. 8A-8B, RFID device 823 is disposed between gripping body 820 and freely rotatable barrel member 840. RFID device 823 may be an active-type RFID device or a passive-type RFID device that is activated upon being brought in close proximity to, e.g., RFID device 446.

In summary, embodiments disclosed herein provide systems and devices for coupling optical fibers with laser surgical systems. In particular, certain aspects provide a connector and an adaptor for coupling an optical fiber with a port of a laser surgical system. The connector and adaptor facilitate mechanical lateral and rotational guidance of the optical fiber during insertion into the port to ensure proper alignment (e.g., clocking) of the optical fiber's cores with a laser beam pattern propagated by the laser surgical system. Accordingly, the connector and adaptor enable improved coupling efficiency between the laser beam pattern and one or more cores of the optical fiber, and therefore improved power uniformity between multiple laser beams transmitted through the cores.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The foregoing description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." The word "exemplary" is used herein to mean "serving as an example, instance, or illustration." Any aspect described herein as "exemplary" is not necessarily to be construed as preferred or advantageous over other aspects.

What is claimed is:

1. A system for coupling an optical fiber to a surgical laser system, comprising:
   a port adapter configured to receive an optical fiber, the port adapter comprising:
      a substantially cylindrical barrel, comprising:
         a distal portion having a first inner diameter;
         a medial portion having a second inner diameter smaller than the first inner diameter;
         a tapered surface disposed between the distal portion and the medial portion, the tapered surface configured to provide axial guidance during insertion of the optical fiber into the port adapter;
         a clocking key disposed on an outer surface of the distal portion, the clocking key configured to facilitate guided rotation of the optical fiber during insertion into the port adapter; and
         a tapered fiber cam slot formed in the distal portion, the tapered fiber cam slot formed on a circumferentially opposed side of the distal portion relative to the clocking key; and
      a sleeve disposed within the medial portion of the barrel, the sleeve configured to provide optical alignment during insertion and removal of the optical fiber into and from the port adapter.

2. The system of claim 1, wherein the clocking key and tapered fiber cam slot of the barrel facilitate a 0° ferrule angle of the optical fiber when the optical fiber is fully inserted into the port adapter.

3. The system of claim 1, wherein the port adapter further comprises:
   a stop collar disposed at a proximal end of the medial portion of the barrel, the stop collar configured to facilitate positioning a ferrule of the optical fiber at an appropriate focal position to receive an input laser or illumination light beam from the surgical laser system.

4. The system of claim 1, wherein the port adapter further comprises:
   a base coupled to the barrel, the base comprising an optical fiber detection window configured to facilitate detection of the optical fiber in the port adapter.

5. The system of claim 4, wherein the system further comprises:
   a condensing lens disposed adjacent to the port adapter, the condensing lens configured to relay an input laser or illumination beam to the optical fiber when the optical fiber is inserted into the port adapter.

6. The system of claim 5, wherein each of the condensing lens and the base of the port adapter comprise a window for transmitting the input laser or illumination beam to the optical fiber when the optical fiber is inserted into the port adapter.

7. The system of claim 1, wherein the sleeve of the port adapter is formed from a ceramic material.

8. The system of claim 1, wherein the system further comprises:
   one or more ball plungers disposed radially outward of the barrel of the port adapter, the ball plungers configured to secure the optical fiber in the port adapter when the optical fiber is fully inserted into the port adapter.

9. The system of claim 1, wherein the system further comprises:
   a cover plate disposed radially outward of the distal portion of the barrel of the port adapter, the cover plate comprising a tapered inner diameter configured to provide coarse axial guidance during insertion of the optical fiber into the port adapter.

10. The system of claim 1, wherein the system further comprises:
    a radio frequency identification (RFID) device, the RFID device configured for identifying a type of the optical fiber when the optical fiber is inserted into the port adapter.

11. The system of claim 1, wherein the optical fiber to be received by the port adapter comprises:
    a connector disposed on a proximal end of the optical fiber, the connector configured to releasably mate with the port adapter via a push-pull retention mechanism to couple the optical fiber and the connector to the surgical laser system in a rotationally guided, clocked angular orientation, with unguided, free rotation of the connector relative to the optical fiber, the connector comprising:
        a ferrule securing the proximal end of the optical fiber therein;
        a ferrule body coupled to a distal end of the ferrule, the ferrule body comprising a fiber key disposed on an outer surface of the ferrule body and configured to mate with the tapered fiber cam slot of the barrel of the port adapter; and
        an outer barrel disposed radially outward of the ferrule and the ferrule body, the outer barrel comprising a main cam slot disposed on an inner surface of the outer barrel and configured to mate with the clocking key of the barrel of the port adapter.

12. The system of claim 11, wherein the outer barrel of the connector further comprises a conical ramp surface disposed on an outer surface of a proximal end of the outer barrel, the conical ramp surface configured to facilitate a capture force by one or more ball plungers of the port adapter when the optical fiber is fully inserted into the port adapter.

13. The system of claim 11, wherein the connector further comprises:
    an axial compression spring disposed circumferentially around the ferrule body and against the inner surface of the outer barrel, the axial compression spring configured to enable spring-loaded axial registration of the ferrule body against the barrel of the port adapter when the optical fiber is fully inserted into the port adapter.

14. The system of claim 11, wherein the ferrule body further comprises one or more slideable rotational alignment features formed on the outer surface of the ferrule body, the one or more rotational alignment features configured to maintain rotational alignment of the ferrule body relative to the outer barrel.

15. The system of claim 11, wherein the connector further comprises:
    a grip distally disposed relative to the connector for holding by a user; and
    a cap adjacent to a proximal end of the grip, the cap comprising:
        a RFID device for identifying a type of the optical fiber;
        a visual clocking rib for approximate visual clocking alignment by the user during insertion of the optical fiber into the port adapter; and
        a snap-fit mechanism that interfaces to the connector.

* * * * *